US012615659B2

(12) United States Patent　(10) Patent No.:　US 12,615,659 B2

Matsuura　(45) Date of Patent:　Apr. 28, 2026

(54) WIRELESS SENSING DEVICE, WIRELESS SENSING SYSTEM, RESOURCE ALLOCATION METHOD, AND MEDIUM

(71) Applicant: Nekka Matsuura, Kanagawa (JP)

(72) Inventor: Nekka Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 545 days.

(21) Appl. No.: 18/185,720

(22) Filed: Mar. 17, 2023

(65) Prior Publication Data

US 2023/0309139 A1　Sep. 28, 2023

(30) Foreign Application Priority Data

Mar. 23, 2022　(JP) ................................. 2022-046998
Feb. 13, 2023　(JP) ................................. 2023-020039

(51) Int. Cl.
*H04W 72/563*　(2023.01)
*H04W 72/0446*　(2023.01)
*H04W 72/0453*　(2023.01)

(52) U.S. Cl.
CPC ..... *H04W 72/563* (2023.01); *H04W 72/0446* (2013.01); *H04W 72/0453* (2013.01)

(58) Field of Classification Search
CPC ........... H04W 72/563; H04W 72/0446; H04W 72/0453
See application file for complete search history.

(56) References Cited

U.S. PATENT DOCUMENTS

| | | | |
|---|---|---|---|
| 6,704,455 B1 | 3/2004 | Yamazaki et al. | |
| 2001/0043752 A1 | 11/2001 | Matsuura et al. | |
| 2002/0191855 A1 | 12/2002 | Matsuura et al. | |
| 2003/0012445 A1 | 1/2003 | Matsuura et al. | |
| 2003/0198397 A1 | 10/2003 | Matsuura et al. | |
| 2004/0114819 A1 | 6/2004 | Matsuura et al. | |
| 2020/0214006 A1 | 7/2020 | Choi et al. | |
| 2023/0086144 A1* | 3/2023 | Roy ........................ | G01S 7/006 |
| | | | 370/329 |
| 2024/0276457 A1* | 8/2024 | Mandelli ............... | H04L 5/0082 |

FOREIGN PATENT DOCUMENTS

| | | | | |
|---|---|---|---|---|
| JP | 2016-092638 | 5/2016 | | |
| JP | 2022-017564 | 1/2022 | | |
| WO | WO-2025151057 A1 * | 7/2025 | ............. | G01S 13/22 |

* cited by examiner

*Primary Examiner* — Melvin C Marcelo
(74) *Attorney, Agent, or Firm* — IPUSA, PLLC

(57) ABSTRACT

A wireless sensing system that senses presence, position, or behavior of an object by a radio wave used for wireless communication, and communicates with a device, includes a wireless sensing device including a wireless communication device, a memory, and a processor configured to, before executing sensing, based on a request for data communication from the device, allocate wireless resources to be used for data communication and the sensing.

16 Claims, 19 Drawing Sheets

| DEVICE ID | DESTINATION INFORMATION | ATTRIBUTE |
|---|---|---|
| D0001 | ADDRESS 1 | POSITION 11, STATE 1 |
| D0002 | ADDRESS 2 | POSITION 12, STATE 2 |
| ... | ... | ... |

| DETECTION ID | ATTRIBUTE |
|---|---|
| S0001 | POSITION 21, TIME 21 |
| S0002 | POSITION 22, TIME 22 |
| ... | ... |

| REGISTRATION ID | PRESENCE FLAG | ATTRIBUTE |
|---|---|---|
| R0001 | 0 | POSITION 31, TIME 31 |
| R0002 | 1 | POSITION 32, TIME 32 |
| ... | ... | ... |

| | 601 |
|---|---|
| DIRECTION 0001 | CSI IN INITIAL STATE (AMPLITUDE VALUE OF ○ OR GREATER AND ○ OR LESS, PHASE VALUE OF ○ OR GREATER AND ○ OR LESS) |
| DIRECTION 0002 | CSI IN INITIAL STATE (AMPLITUDE VALUE OF ○ OR GREATER AND ○ OR LESS, PHASE VALUE OF ○ OR GREATER AND ○ OR LESS) |
| ⋮ | ⋮ |

FIG.6B

| | 602 | |
|---|---|---|
| DIRECTION 0001 | CSI VALUE AT TIME T 11 | CSI VALUE AT TIME T 12 | ⋮ |
| DIRECTION 0002 | CSI VALUE AT TIME T 21 | CSI VALUE AT TIME T 22 | ⋮ |
| ⋮ | ⋮ | ⋮ | ⋮ |

FIG.6C

| | 603 |
|---|---|
| DIRECTION 0001 | INITIAL-STATE RADAR REFLECTION VALUE (REFLECTION VALUE OF ◯ OR GREATER AND ◯ OR LESS, RECEPTION TIME OF ◯ S OR GREATER AND ◯ S OR LESS) |
| DIRECTION 0002 | INITIAL-STATE RADAR REFLECTION VALUE (REFLECTION VALUE OF ◯ OR GREATER AND ◯ OR LESS, RECEPTION TIME OF ◯ S OR GREATER AND ◯ S OR LESS) |
| ⋮ | ⋮ |

FIG.6D

| | | | 604 |
|---|---|---|---|
| DIRECTION 0001 | RADAR REFLECTION VALUE AT TIME T 11 | RADAR REFLECTION VALUE AT TIME T 12 | ⋯ |
| DIRECTION 0002 | RADAR REFLECTION VALUE AT TIME T 21 | RADAR REFLECTION VALUE AT TIME T 22 | ⋯ |
| ⋮ | ⋮ | ⋯ | ⋯ |

FIG.8A

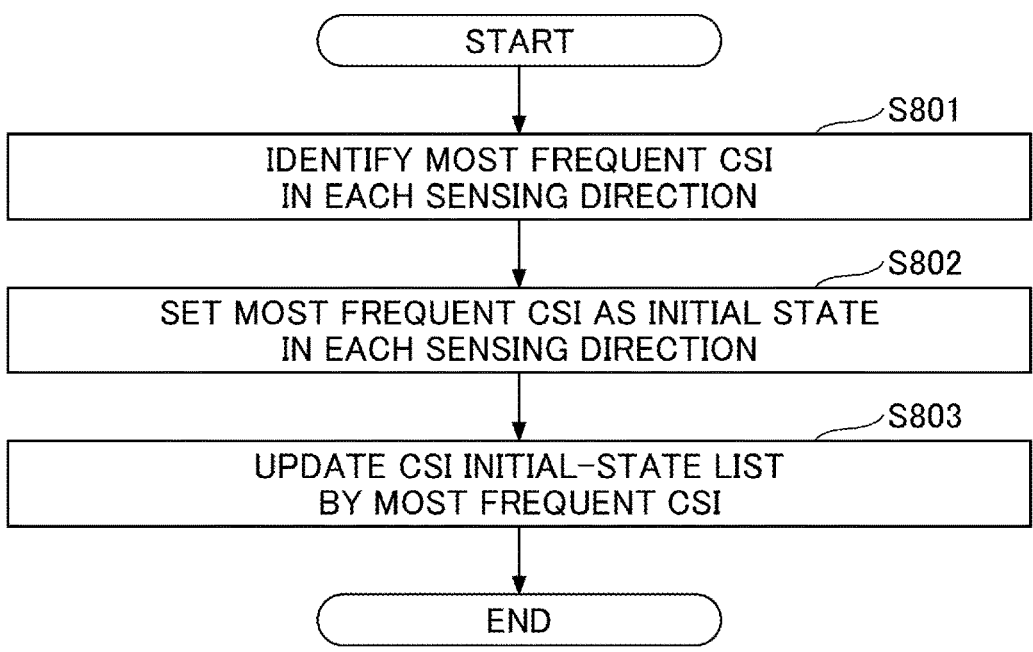

START

S801
IDENTIFY MOST FREQUENT CSI
IN EACH SENSING DIRECTION

S802
SET MOST FREQUENT CSI AS INITIAL STATE
IN EACH SENSING DIRECTION

S803
UPDATE CSI INITIAL-STATE LIST
BY MOST FREQUENT CSI

END

FIG.8B

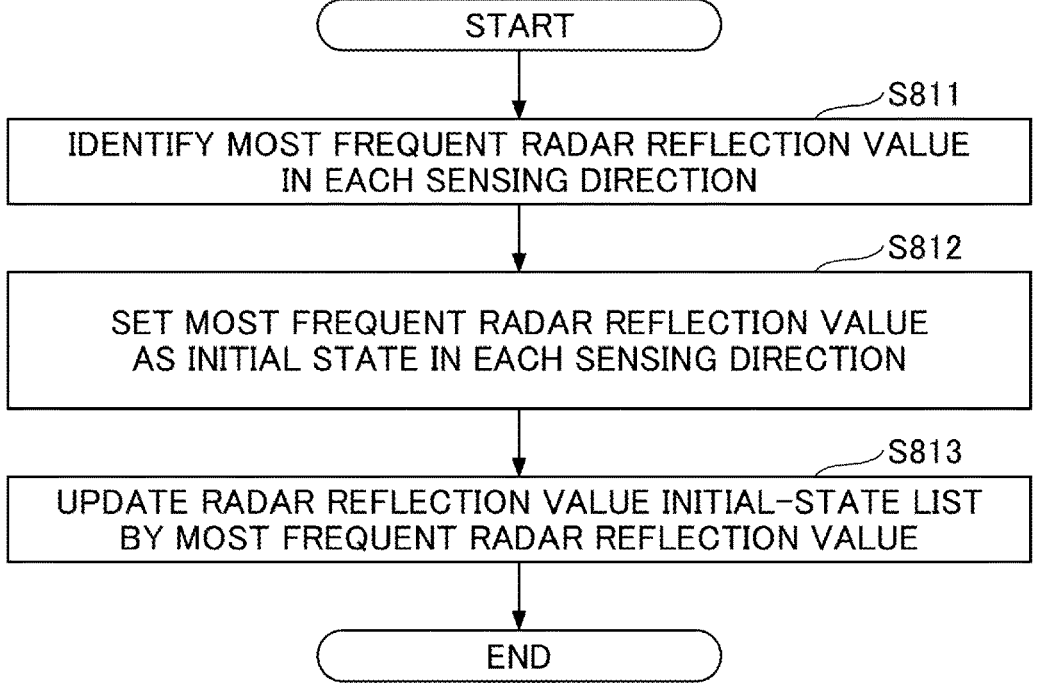

START

S811
IDENTIFY MOST FREQUENT RADAR REFLECTION VALUE
IN EACH SENSING DIRECTION

S812
SET MOST FREQUENT RADAR REFLECTION VALUE
AS INITIAL STATE IN EACH SENSING DIRECTION

S813
UPDATE RADAR REFLECTION VALUE INITIAL-STATE LIST
BY MOST FREQUENT RADAR REFLECTION VALUE

END

FIG.9A

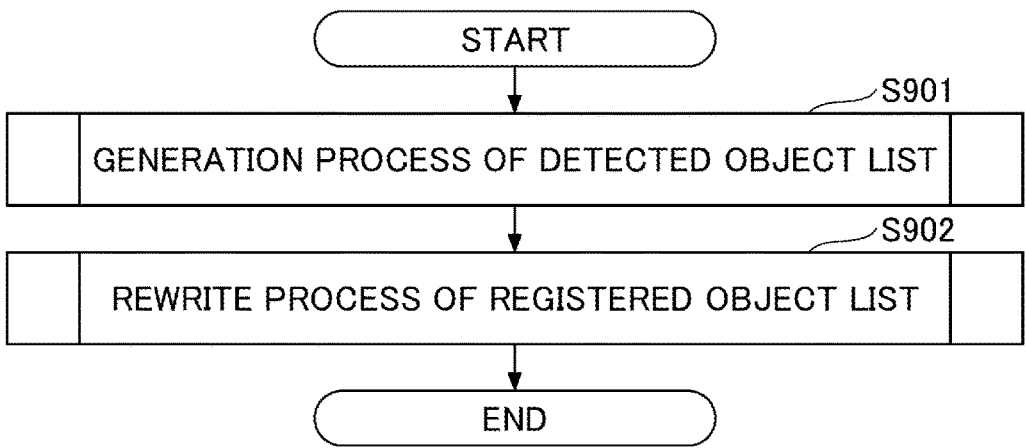

START

S901

GENERATION PROCESS OF DETECTED OBJECT LIST

S902

REWRITE PROCESS OF REGISTERED OBJECT LIST

END

FIG.9B

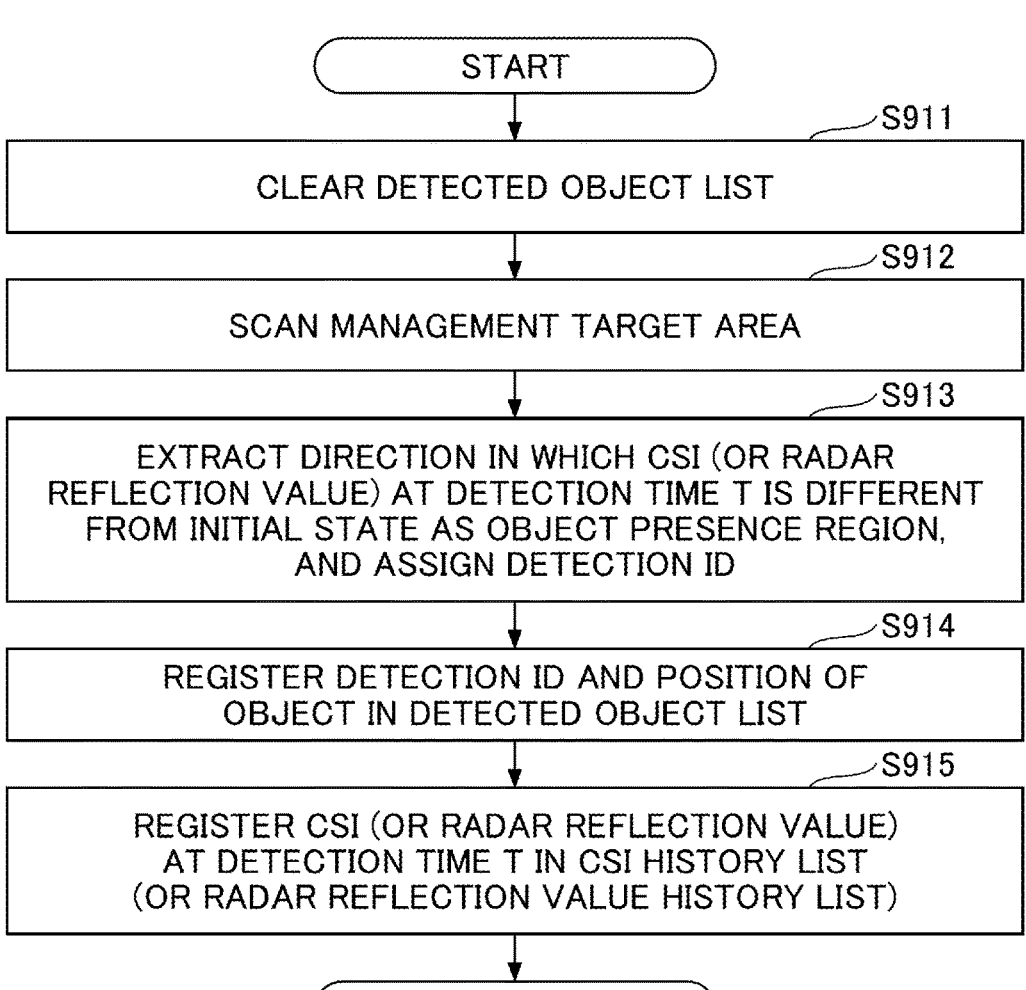

START

S911

CLEAR DETECTED OBJECT LIST

S912

SCAN MANAGEMENT TARGET AREA

S913

EXTRACT DIRECTION IN WHICH CSI (OR RADAR
REFLECTION VALUE) AT DETECTION TIME T IS DIFFERENT
FROM INITIAL STATE AS OBJECT PRESENCE REGION,
AND ASSIGN DETECTION ID

S914

REGISTER DETECTION ID AND POSITION OF
OBJECT IN DETECTED OBJECT LIST

S915

REGISTER CSI (OR RADAR REFLECTION VALUE)
AT DETECTION TIME T IN CSI HISTORY LIST
(OR RADAR REFLECTION VALUE HISTORY LIST)

END

START

S1211

UPDATE CSI HISTORY LIST BY GENERATION
PROCESS OF DETECTED OBJECT LIST

S1212

DEVICE DETECTS
PREDETERMINED EVENT?

NO

YES

S1213

CAUSE MACHINE LEARNING MODEL TO LEARN CSI
FOR PREDETERMINED PERIOD BEFORE
PREDETERMINED EVENT, WITH DETECTION OF
PREDETERMINED EVENT AS TRAINING DATA

S1214

MACHINE LEARNING
EXECUTED FOR A PREDETERMINED
NUMBER OF TIMES?

NO

YES

END

FIG.13A

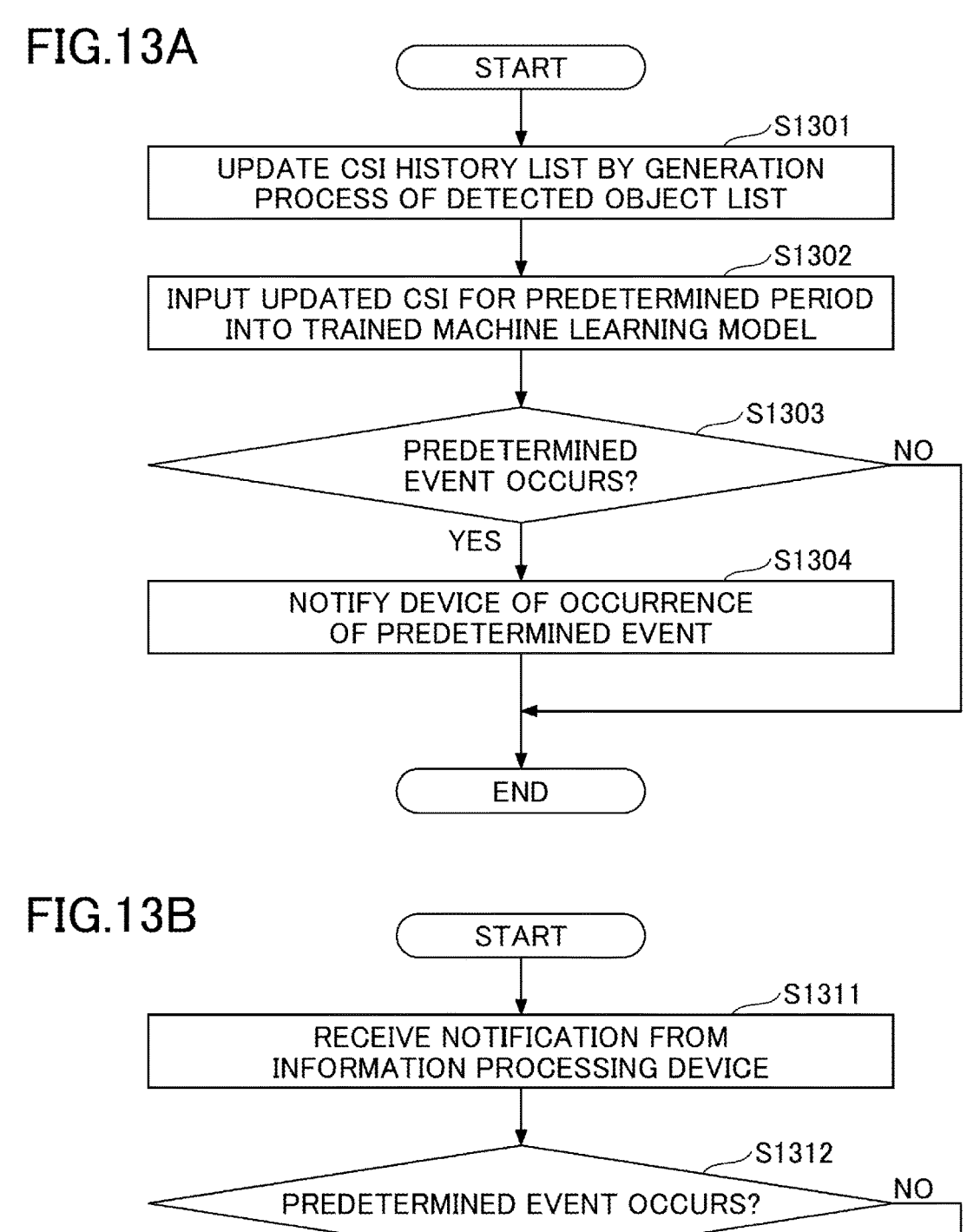

START

UPDATE CSI HISTORY LIST BY GENERATION
PROCESS OF DETECTED OBJECT LIST          S1301

INPUT UPDATED CSI FOR PREDETERMINED PERIOD
INTO TRAINED MACHINE LEARNING MODEL          S1302

PREDETERMINED
EVENT OCCURS?          S1303          NO

YES

NOTIFY DEVICE OF OCCURRENCE
OF PREDETERMINED EVENT          S1304

END

FIG.13B

START

RECEIVE NOTIFICATION FROM
INFORMATION PROCESSING DEVICE          S1311

PREDETERMINED EVENT OCCURS?          S1312          NO

YES

EXECUTE PROCESS CORRESPONDING
TO PREDETERMINED EVENT          S1313

END

FIG.14

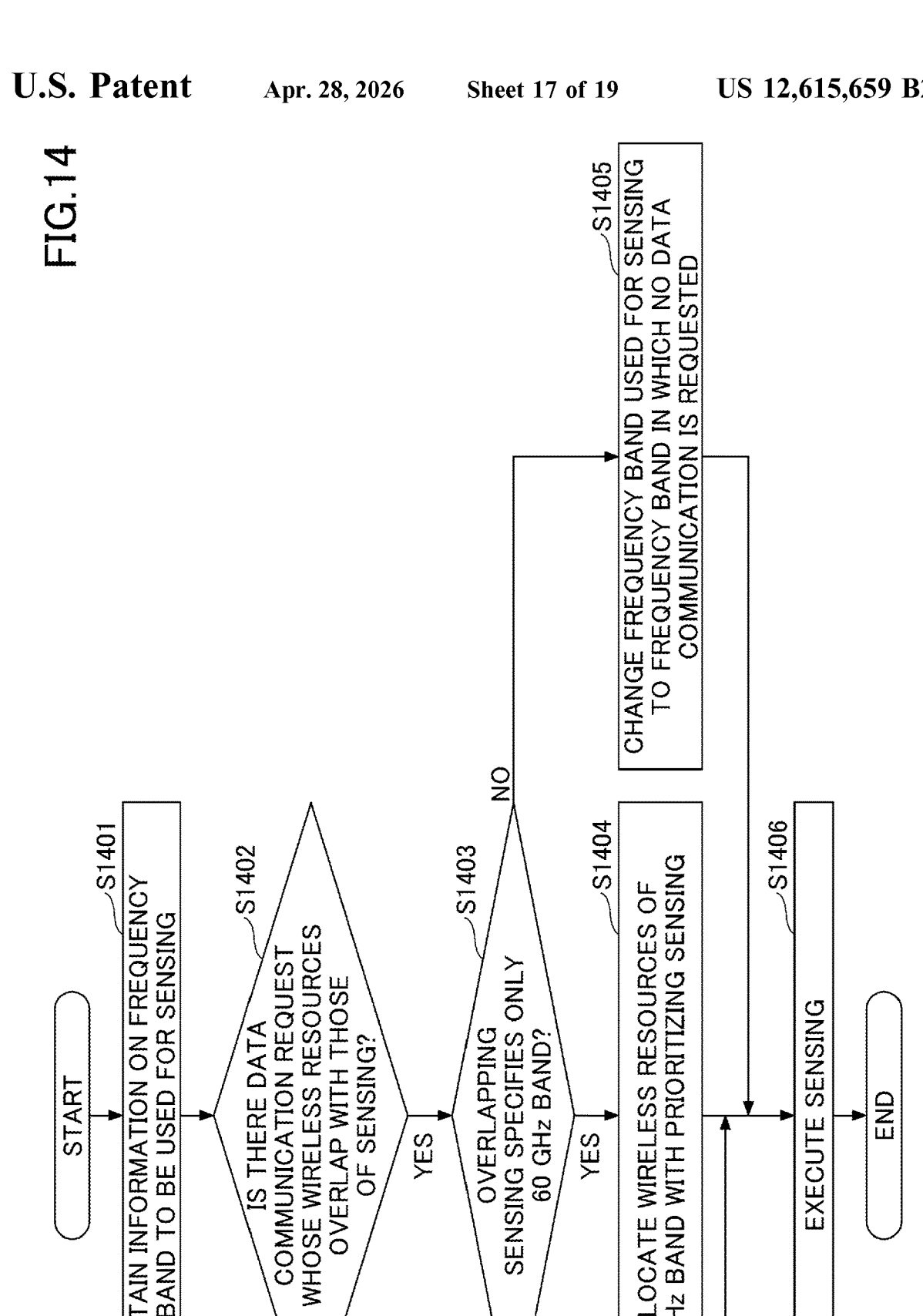

START

S1401
OBTAIN INFORMATION ON FREQUENCY BAND TO BE USED FOR SENSING

S1402
IS THERE DATA COMMUNICATION REQUEST WHOSE WIRELESS RESOURCES OVERLAP WITH THOSE OF SENSING?

NO

YES

S1403
OVERLAPPING SENSING SPECIFIES ONLY 60 GHz BAND?

NO

YES

S1404
ALLOCATE WIRELESS RESOURCES OF 60 GHz BAND WITH PRIORITIZING SENSING

S1405
CHANGE FREQUENCY BAND USED FOR SENSING TO FREQUENCY BAND IN WHICH NO DATA COMMUNICATION IS REQUESTED

S1406
EXECUTE SENSING

END

WIRELESS SENSING DEVICE, WIRELESS SENSING SYSTEM, RESOURCE ALLOCATION METHOD, AND MEDIUM

CROSS-REFERENCE TO RELATED APPLICATIONS

The present application is based upon and claims the benefit of priority under 35 U.S.C. § 119 to Japanese Patent Application No. 2022-046998 filed on Mar. 23, 2022, and Japanese Patent Application No. 2023-020039 filed on Feb. 13, 2023, the entire contents of which are hereby incorporated by reference.

BACKGROUND OF THE INVENTION

1. Field of the Invention

The present disclosure relates to a wireless sensing device, a wireless sensing system, a resource allocation method, and a medium.

2. Description of the Related Art

There has been an information processing system that detects an approach of a person and provides a predetermined service to the approaching person. For example, an image processing device has been known that tracks a person present within a predetermined range, and in the case where the person is approaching, determines a state of its own device, and issues a guidance request to another image processing device according to a determination result (e.g., see Japanese Laid-Open Patent Application No. 2016-092638).

In addition, a wireless communication system has been known that obtains channel state information (CSI) indicating a state of a radio wave in communication in a wireless local area network (LAN), and detects a direction of movement of an object based on a feature value extracted from the CSI (e.g., see Japanese Laid-Open Patent Application No. 2022-017564).

In wireless communication, multiple frequency bands are used. For example, in wireless LAN communication, the 2.4 GHz band, the 5 GHz band, the 60 GHz band, and the like are used. There has been a demand for executing data communication and wireless sensing for sensing presence, position, behavior, and the like of an object using such multiple frequency bands.

However, the principal purpose of wireless LAN communication or the like is data communication, and it is not desirable to hinder data communication due to wireless sensing.

SUMMARY OF THE INVENTION

According to an embodiment in the present disclosure, a wireless sensing system that senses presence, position, or behavior of an object by a radio wave used for wireless communication, and communicates with a device, includes a wireless sensing device including a wireless communication device, a memory, and a processor configured to, before executing sensing, based on a request for data communication from the device, allocate wireless resources to be used for data communication and the sensing.

BRIEF DESCRIPTION OF DRAWINGS

FIG. 2 is a diagram illustrating an example of a hardware configuration of a computer according to one embodiment;

FIGS. 5A to 5C are diagrams (part 1) illustrating schematic views of management information managed by a wireless sensing system according to one embodiment;

FIGS. 6A to 6D are diagrams (part 2) illustrating schematic views of management information managed by a wireless sensing system according to one embodiment;

FIGS. 8A and 8B are flow charts illustrating examples of an initial state setting process according to one embodiment;

FIG. 9A is a flow chart illustrating an example of a process of updating registered objects according to one embodiment;

FIG. 9B is a flow chart illustrating an example of a process of generating an object list according to one embodiment;

FIGS. 13A and 13B are flow charts illustrating examples of processes after machine learning according to one embodiment;

FIG. 14 is a flow chart illustrating an example of a process of allocating wireless resources according to a first embodiment;

DETAILED DESCRIPTION OF THE EMBODIMENTS

In the following, embodiments in the present disclosure will be described with reference to the accompanying drawings.

According to an embodiment in the present disclosure, it becomes possible to appropriately allocate wireless resources to wireless sensing according to a communication environment in a wireless sensing system that senses an object by a radio wave used for wireless communication.

\<System Configuration\>

Figure 1:
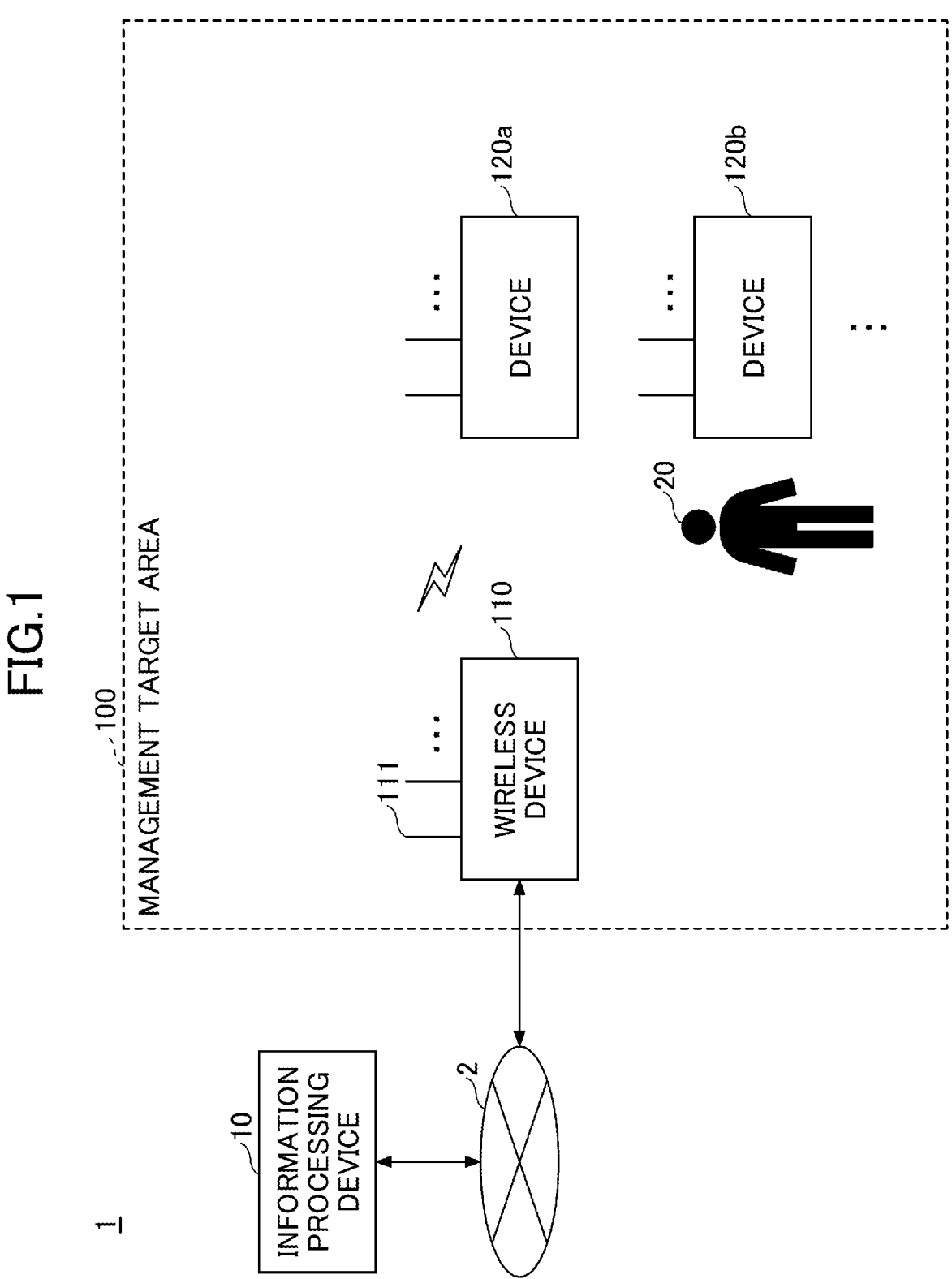
FIG. 1 is a diagram illustrating an example of a system configuration of a wireless sensing system according to one embodiment.

FIG. 1 is a diagram illustrating an example of a system configuration of a wireless sensing system according to one embodiment. A wireless sensing system 1 includes, for example, a wireless device 110 and one or more devices 120a, 120b, and so on, installed in a management target area 100, and an information processing device 10 capable of communicating with the wireless device 110 via a communication network 2. Note that in the following description, the "device 120" is used for denoting any device(s) among one or more devices 120a, 120b, and so on.

The wireless device 110 is a wireless sensing device that includes multiple antennas 111 and is capable of beamforming by MIMO (Multi Input Multi Output) and phase control. In the example in FIG. 1, the wireless device 110 has functions of an access point of wireless LAN (Local Area Network) communication, and is capable of communicating with the device 120 by wireless LAN communication. However, the wireless device 110 is not limited as such, and may have functions of a wireless base station used in mobile communication.

The management target area 100 is, for example, a conference room in which a device 120 such as, for example, an image forming device, a projector, or an electronic blackboard is installed. As another example, the management target area 100 is a store in which a device 120 such as, for example, an image forming device, a digital signage, or the like is installed. Note that the management target area 100 may be an area other than a conference room and a store.

The device 120 has, for example, functions of a wireless LAN communication station; is connected to the wireless LAN network provided by the wireless device 110; and is capable of communicating with the information processing device 10 via the communication network 2 such as the Internet or a LAN. However, the device 120 is not limited as such, and may have a function of connecting to the communication network 2 by a wired LAN or the like without the intervening wireless device 110.

The information processing device (wireless sensing device) 10 is an information processing device having a configuration of a computer or a system including multiple computers. By executing a predetermined program, the information processing device 10 executes a process of sensing presence, position, behavior (action), or the like of an object (e.g., a person 20 using the device 120) in the management target area 100, based on the state of a radio wave transmitted by the wireless device 110.

The state of the radio wave transmitted from the wireless device 110 to the information processing device 10 includes, for example, channel state information (CSI) obtained by wireless LAN communication. CSI is information representing a state of a propagation path between a transmitter and a receiver extracted in a physical layer of wireless communication. CSI represents, for example, change in amplitude and change in phase due to propagation loss, multipath caused by reflection, diffraction, or the like of a transmitted radio wave.

Specifically, in the case where communication is executed by using multiple subcarriers, and when denoting an Mt-dimensional transmission vector obtained by an i-th subcarrier as Xi; an Mr-dimensional reception vector obtained by the i-th subcarrier is as Yi; and an Mr-dimensional noise vector as Ni, an Mt×Mr-dimensional matrix Hi expressed by the following formula is a matrix obtained by the i-th subcarrier.

$$Yi = Hi\ Xi + Ni \qquad \text{(Formula 1)}$$

Denoting each element of Hi as $h_{mn}$, $h_{mn}$ is a value of CSI of a propagation path between an m-th reception antenna and an n-th reception antenna.

Note that CSI is an example of a state of a radio wave transmitted by the wireless device 110 to the information processing device 10. The wireless device 110 may further have, for example, a radar function, to transmit a radar reflection value to the information processing device 10 as the state of the radio wave in addition to (or instead of) the CSI.

Having the configuration described above, the wireless sensing system 1 executes wireless sensing for sensing, for example, presence, position, behavior (action), or the like of an object such as a person 20 who operates a device 120, based on the state of a radio wave transmitted from the wireless device 110 to the information processing device 10.

Note that the system configuration of the wireless sensing system 1 illustrated in FIG. 1 is merely an example. For example, the information processing device 10 may be provided in the management target area 100. In addition, functions of the information processing device 10 may be included in, for example, the wireless device 110 or the device 120, or may be distributed among the information processing device 10, the wireless device 110, and the device 120.

<Hardware Configuration>

Next, examples of hardware configurations of the devices included in the wireless sensing system 1 will be described. (Hardware Configuration of Information Processing Device)

Figure 2:
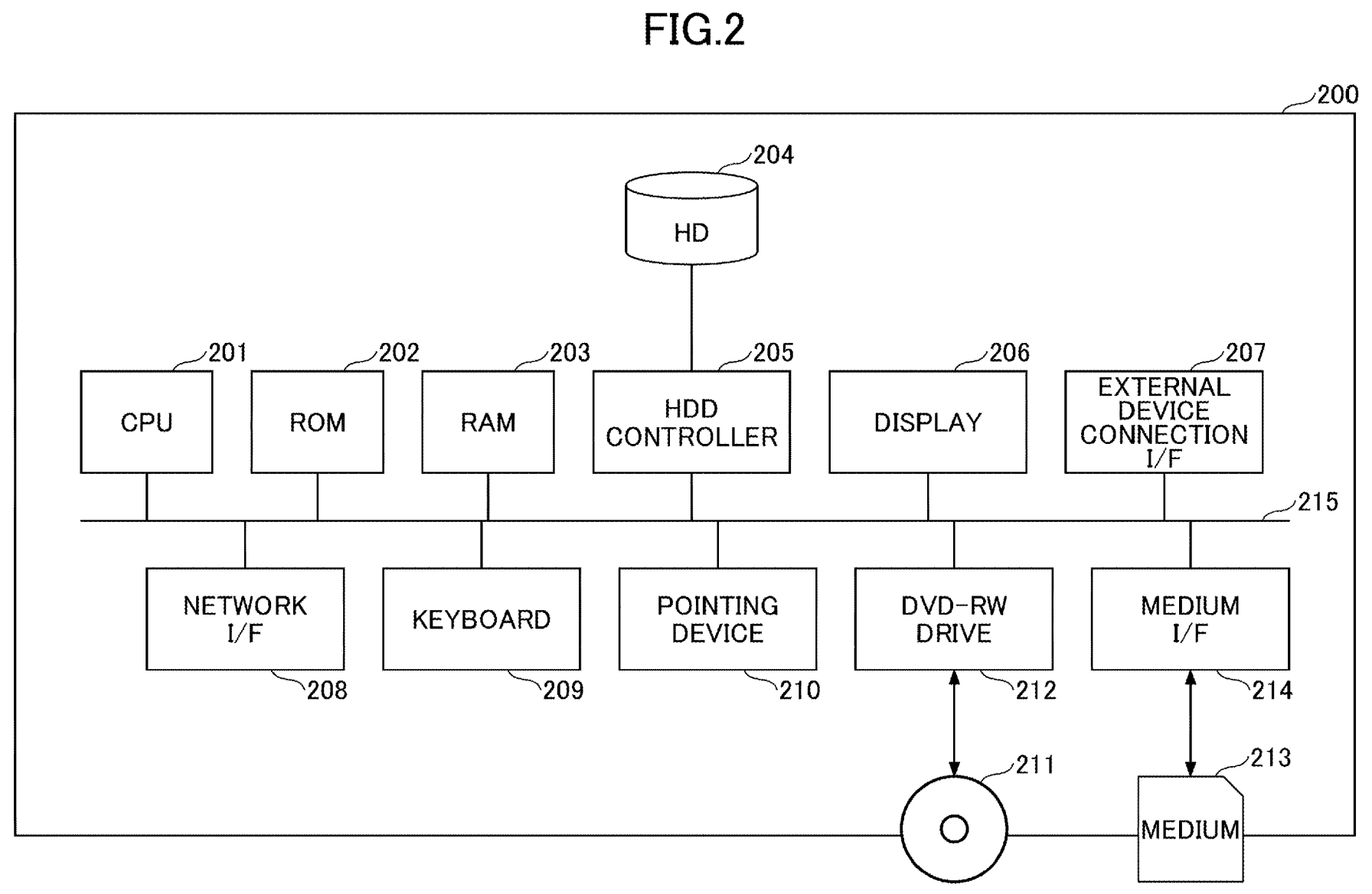

The information processing device 10 has a hardware configuration of a computer 200, for example, as illustrated in FIG. 2. Alternatively, the information processing device 10 may be configured with multiple computers 200.

FIG. 2 is a diagram illustrating an example of a hardware configuration of a computer according to one embodiment. The computer 200 includes, for example, a central processing unit (CPU) 201, a read-only memory (ROM) 202, a random access memory (RAM) 203, a hard disk (HD) 204, a hard disk drive (HDD) controller 205, a display 206, an external device connection interface (I/F) 207, a network I/F 208, a keyboard 209, a pointing device 210, a digital versatile disk rewritable (DVD-RW) drive 212, a medium I/F 214, a bus line 215, and the like.

Among these, the CPU 201 controls overall operations of the computer 200. The ROM 202 stores, for example, a program used for activating the CPU 201, such as an IPL. The RAM 203 is used as a work area of the CPU 201 or the like. The HD 204 stores various items of information such as programs. The HDD controller 205 controls reading or writing of various items of information on the HD 204 under control of the CPU 201.

The display 206 displays various items of information such as a cursor, a menu, a window, a character, or an image. The external device connection I/F 207 is an interface for connecting various external devices. The network I/F 208 is an interface for executing data communication using the communication network 2.

The keyboard 209 is a type of input device including multiple keys for inputting characters, numerical values, various commands, and the like. The pointing device 210 is a type of input device for selecting and executing various commands, selecting a processing target, moving a cursor, and the like. The DVD-RW drive 212 controls reading and writing of various items of information on the DVD-RW 211 as an example of a removable recording media. Note that the DVD-RW 211 is not limited to DVD-RW, and may other recording media. The medium I/F 214 controls reading or writing (storing) with respect to a medium 213 such as a flash memory. The bus line 215 includes an address bus, a data bus, various control signals, and the like for electrically connecting the components described above.

(Hardware Configuration of Wireless Device)

Figure 3A:
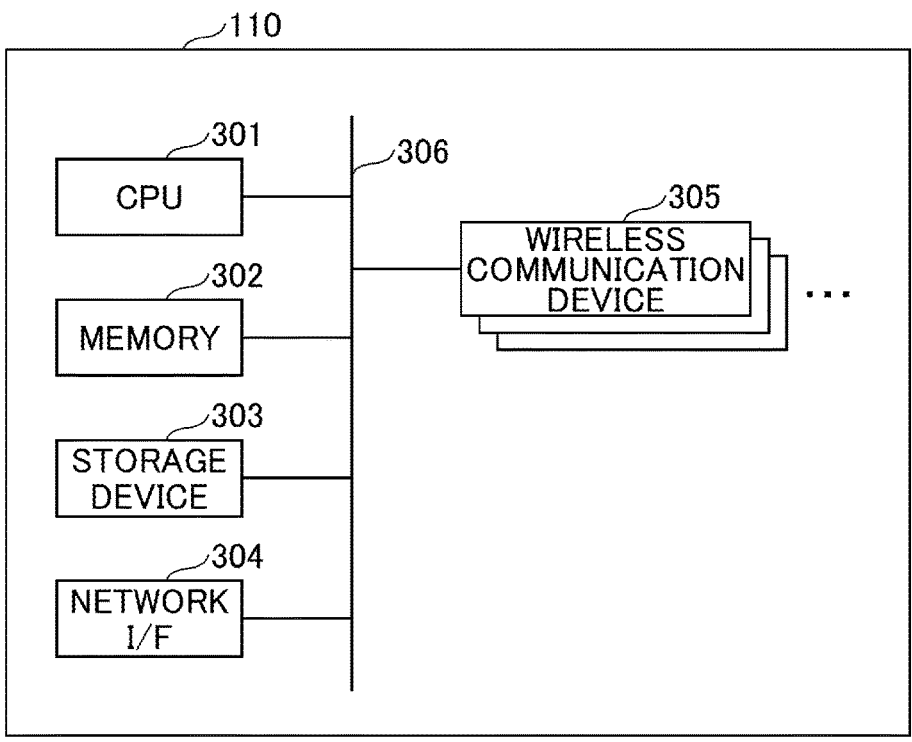
FIGS. 3A and 3B are diagrams illustrating examples of respective hardware configurations of a wireless device and a device according to one embodiment.

FIG. 3A illustrates an example of a hardware configuration of a wireless device according to one embodiment. As an example, the wireless device 110 includes a CPU 301, a memory 302, a storage device 303, a network I/F 304, one or more wireless communication devices 305, and a bus 306.

The CPU 301 is, for example, an arithmetic/logic device (processor) that implements functions of the wireless device 110 by reading a program or data stored in the storage device 303 or the like onto the memory 302 to execute processing. The memory 302 includes, for example, a RAM used as a work area or the like of the CPU 301, and a ROM storing a program for activating the wireless device 110, and the like. The storage device 303 is a non-volatile large-capacity storage device that stores an operating system (OS), applications, various types of data, and the like, and is implemented by, for example, a solid state drive (SSD), a hard disk drive (HDD), or the like.

The network I/F 304 is an interface for executing communication with the information processing device 10 and the like, using the communication network 2. The one or more wireless communication devices 305 include, for example, a wireless circuit, an antenna, a communication control device, and the like that execute wireless LAN communication or wireless wide area network (WAN) communication to obtain CSI. The bus 306 is commonly connected to the components described above, and transmits, for example, an address signal, a data signal, various control signals, and the like.

(Hardware Configuration of Device)

Figure 3B:
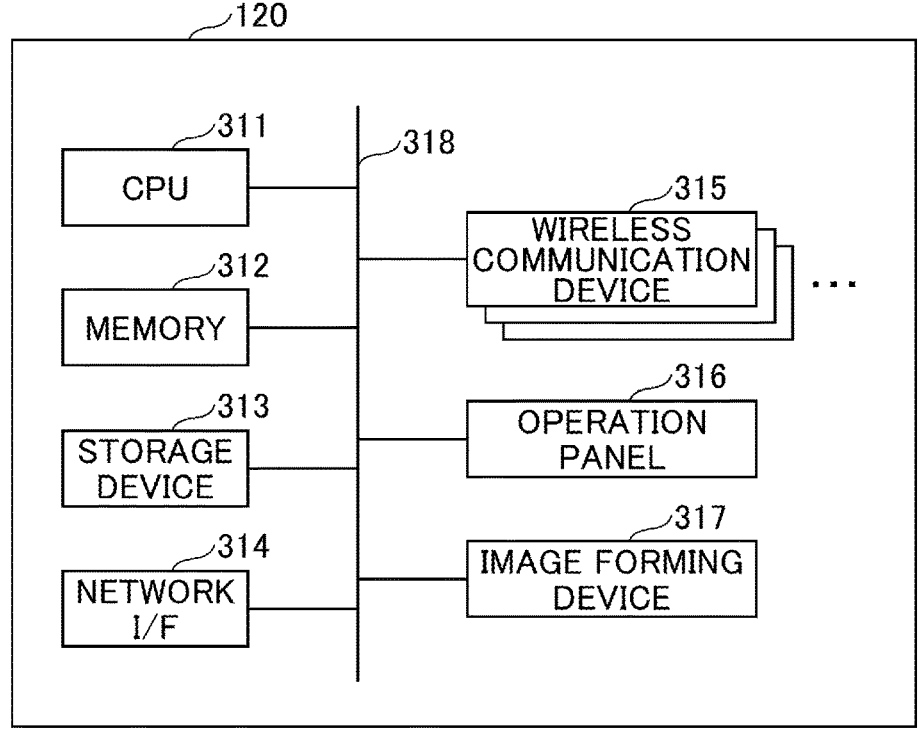

FIG. 3B illustrates an example of a hardware configuration of a device according to one embodiment. The example in FIG. 3B illustrates an example of a hardware configuration in the case where the device 120 is an image forming device such as a copier, printer, multifunction device, or the like.

As an example, the device 120 includes a CPU 301, a memory 312, a storage device 313, a network I/F 304, one or more wireless communication devices 315, an operation panel 316, an image forming device 317, and a bus 318. Note that as the CPU 311, the memory 312, the storage device 313, the network I/F 314, and the bus 318 are substantially the same as the CPU 311, the memory 302, the storage device 303, the network I/F 304, and the bus 306 described in FIG. 3A, description of these will be omitted.

The one or more wireless communication devices 315 include a wireless circuit, an antenna, a communication control device, and the like of the same wireless communication scheme as the one or more wireless communication devices 305 included in the wireless device 110. The operation panel 316 includes a display to display an operation screen or the like, a touch panel to receive an operation on the operation screen or the like, an operation button, or the like. The image forming device 317 includes an image forming device such as a printer engine to execute printing or a scan engine to execute scanning.

Note that the hardware configuration of the device 120 illustrated in FIG. 3B is merely an example. For example, in the case where the device 120 is a device other than an image forming device, the device 120 may or may not include the image forming device 317.

<Functional Configuration>

Figure 4:
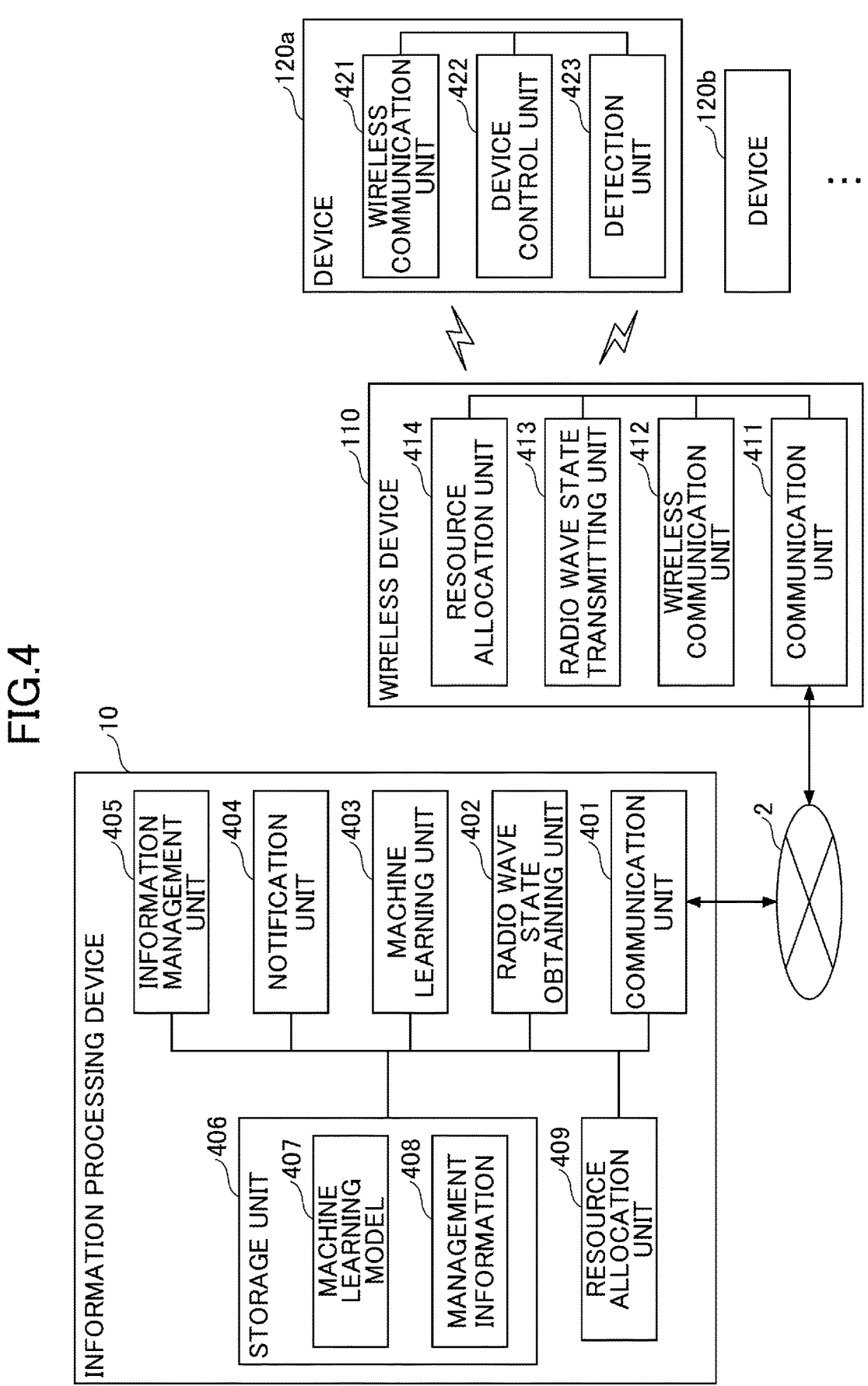
FIG. 4 is a diagram illustrating an example of a functional configuration of a wireless sensing system according to one embodiment.

Next, a functional configuration of a wireless sensing system according to the present embodiment will be described. FIG. 4 is a diagram illustrating an example of a functional configuration of a wireless sensing system according to one embodiment. Note that in FIG. 4, it is assumed that the device 120b has the same functional configuration as the device 120a.

(Functional Configuration of Information Processing Device)

In the information processing device 10, for example, the CPU 201 executing a predetermined program implements a functional configuration of a communication unit 401, a radio wave state obtaining unit 402, a machine learning unit 403, a notification unit 404, an information management unit 405, a storage unit 406, and a resource allocation unit 409. Note that at least part of the functional configuration described above may be implemented by hardware.

The communication unit 401 connects the information processing device 10 to the communication network 2, for example, by using the network I/F 208, and communicates with the wireless device 110, the device 120, and the like. For example, the communication unit 401 executes a reception process of receiving information indicating that a predetermined event has been detected from the device 120.

The radio wave state obtaining unit 402 executes a process of obtaining a radio wave state to obtain the state of the radio wave in the management target area 100 from the wireless device 110 via the communication unit 401. For example, the radio wave state obtaining unit 402 obtains CSI (an example of a state of a radio wave) obtained by wireless LAN communication or the like from the wireless device 110. Note that the radio wave state obtaining unit 402 may obtain a radar reflection value (another example of a state of a radio wave) instead of (or in addition to) the CSI from the wireless device 110.

The machine learning unit 403 stores in the storage unit 406 or the like, for example, a machine learning model 407 for estimating the action of the person 20 who operates the device 120. In addition, for example, the machine learning unit 403 executes a machine learning process that causes the machine learning model 407 to learn states of radio waves in a predetermined period before a predetermined event, with the predetermined event being detected by a device control unit 422 of the device 120 as training data.

In addition, the machine learning unit 403 inputs a state of a radio wave (e.g., CSI) obtained by the radio wave state obtaining unit 402 as input data to the trained machine learning model 407, and determines whether or not a predetermined event has occurred in the device 120.

In the case where the machine learning unit 403 determines that a predetermined event has occurred in the device 120, the notification unit 404 executes a notification process of notifying the device 120 of an occurrence of the predetermined event via the communication unit 401.

The information management unit 405 stores and manages management information 408 including a registered device list 501, a detected object list 502, a registered object list 503, a CSI initial state list 601, and a CSI history list 602 that will be described later, in the storage unit 406 or the like. Note that the information management unit 405 may manage a radar reflection value initial state list 603, a radar reflection value history list 604, and the like in addition to (or instead of) the CSI initial state list 601 and the CSI history list 602.

The storage unit 406 is implemented by, for example, a program executed by the CPU 201, the HD 204, the HDD controller 205, the RAM 203, and the like, and stores various items of information including the machine learning model 407 and the management information 408, data, programs, and the like.

For example, the resource allocation unit 409 executes a resource allocation process that allocates wireless resources to be used for data communication and sensing, based on a request for data communication from the device 120. Note that the resource allocation process will be described later.

(Functional Configuration of Wireless Device)

In the wireless device 110, for example, the CPU 301 executing a predetermined program implements a functional configuration including a communication unit 411, a wireless communication unit 412, a radio wave state transmitting unit 413, a resource allocation unit 414, and the like. Note that at least part of the functional configuration described above may be implemented by hardware.

The communication unit 411 connects the wireless device 110 to the communication network 2, for example, by using the network I/F 304, and communicates with the information processing device 10 and the like.

The wireless communication unit 412 causes the wireless communication device 305 to function as, for example, an access point of wireless LAN communication, to relay communication between the information processing device 10 and the device 120.

The radio wave state transmitting unit 413 obtains CSI (an example of a state of a radio wave) in the management target area 100, for example, by using the wireless communication device 305, and transmits the obtained CSI to the information processing device 10 via the communication unit 411. In addition, the radio wave state transmitting unit 413 may transmit a radar reflection value (another example of a state of a radio wave) to the information processing device 10 via the communication unit 411 in addition to (or instead of) the CSI.

For example, the resource allocation unit 414 executes a resource allocation process that allocates wireless resources to be used for data communication and sensing, based on a request for data communication from the device 120. Note that the resource allocation process may be executed by the resource allocation unit 409 of the information processing device 10 or may be executed by the resource allocation unit 414 of the wireless device 110. In addition, the resource allocation process may be executed cooperatively by the resource allocation unit 409 and the resource allocation unit 414. Note that the resource allocation process will be described later.

(Functional Configuration of Device)

In the device 120, for example, the CPU 311 executing a predetermined program implements a functional configuration including a wireless communication unit 421, a device control unit 422, a detection unit 423, and the like. Note that at least part of the functional configuration described above may be implemented by hardware.

The wireless communication unit 421 causes the wireless communication device 315 to function as, for example, a station of wireless LAN communication, to communicates with the information processing device 10 via the wireless device 110.

As an example, the device control unit 422 controls the operation panel 316, the image forming device 317, and the like, to cause the device 120 to function as an image forming device. For example, the device control unit 422 displays an operation screen on the operation panel 316, and executes an image forming process such as copying, printing, scanning, or the like according to an operation on the operation screen performed by the person 20. Note that the device control unit 422 causes the device 120 to function as a projector in the case where the device 120 is a projector, and causes the device 120 to function as an electronic blackboard in the case where the device 120 is an electronic blackboard.

The detection unit 423 detects a predetermined event in the device 120, and in the case of detecting the predetermined event, notifies the information processing device 10 of an occurrence of the predetermined event via the wireless communication unit 421 or the like. As one specific example, the detection unit 423 detects, as a predetermined event, a user who is confused with an operation on the device 120, trial and error of the user, and the like.

Examples of Management Information

Next, examples of the management information 408 managed by the information management unit 405 will be described. FIGS. 5A to 5C and 6A to 6D are diagrams illustrating schematic views of management information managed by a wireless sensing system according to one embodiment.

(Registered Device List)

FIG. 5A illustrates a schematic view of the registered device list 501 managed by the information management unit 405. The registered device list 501 is a list for managing information on the devices 120a, 120b, and so on in the management target area 100. In the example in FIG. 5A, the registered device list 501 includes information such as "device ID", "destination information", and "attribute" as items.

The device ID is identification information for identifying a device 120. Here, "destination information" is destination information (address information or the like) for the information processing device 10 to communicate with the device 120. In addition, "attribute" is information accompanying the device 120, and is information on a position (three-dimensional coordinates) and a state (e.g., power on/off, operation mode, necessity of authentication, and the like) of the device 120 necessary for managing the device 120.

(Detected Object List)

FIG. 5B illustrates a schematic view of the detected object list 502 managed by the information management unit 405. The detected object list 502 is a temporary list used for grasping objects (the person 20, etc.) present in the management target area 100, and updating the registered object list 503. In the example in FIG. 5B, the detected object list 502 includes information such as "detection ID" and "attribute" as items. Here, "detection ID" is identification information for identifying a detected object. In addition, "attribute" is information accompanying the detected object and is information on the position (three-dimensional coordinates), detected time, and the like of the object necessary for managing the object.

(Registered Object List)

FIG. 5C illustrates a schematic view of the registered object list 503 managed by the information management unit 405. The registered object list 503 is a list for managing information on objects (persons 20, etc.) present in the management target area 100. In the example in FIG. 5C, the registered object list 503 includes information such as "detection ID", "presence flag", "attribute", and the like as items. Here, "detection ID" is identification information for identifying an object. In addition, "presence flag" is flag information indicating whether the object is present (1) or not present (0) in the management target area 100. In addition, "attribute" is information accompanying the registered object and is information on the position (three-dimensional coordinates) of the object, time when the position is confirmed, and the like that are necessary for managing the object.

(CSI Initial State List)

FIG. 6A illustrates a schematic view of the CSI initial state list 601 managed by the information management unit 405. The CSI initial state list 601 is a list that stores CSI in an initial state obtained in each scanning direction by spatial scanning using known beamforming in the management target area 100.

(CSI History List)

FIG. 6B illustrates a schematic view of the CSI history list 602 managed by the information management unit 405. The CSI history list 602 is a list that stores a history of CSI values in each scanning direction obtained by the wireless device 110 at predetermined time intervals by spatial scanning using known beamforming.

(Radar Reflection Value Initial State List)

FIG. 6C illustrates a schematic view of the radar reflection value initial state list 603 managed by the information management unit 405. In the case where wireless sensing is executed in a frequency band in a millimeter wave band or higher, the wireless device 110 can execute radar sensing in which an object is irradiated with a radio wave, and the position of the object is identified by a reflected wave. The radar reflection value initial state list is a list that stores radar reflection values in an initial state obtained in each scanning direction by radar sensing.

(Radar Reflection Value History List)

FIG. 6D illustrates a schematic view of the radar reflection value history list 604 managed by the information management unit 405. The radar reflection value history list 604 is a list that stores a history of the radar reflection value in each scanning direction obtained by the wireless device 110 at predetermined time intervals with the radar sensing.

<Flow of Position Detection Process>

Next, a flow of a position detection process executed by the wireless sensing system 1 to detect and track the position of an object such as the person 20 in the management target area 100 will be described.

(Position Detection Process)

Figure 7:
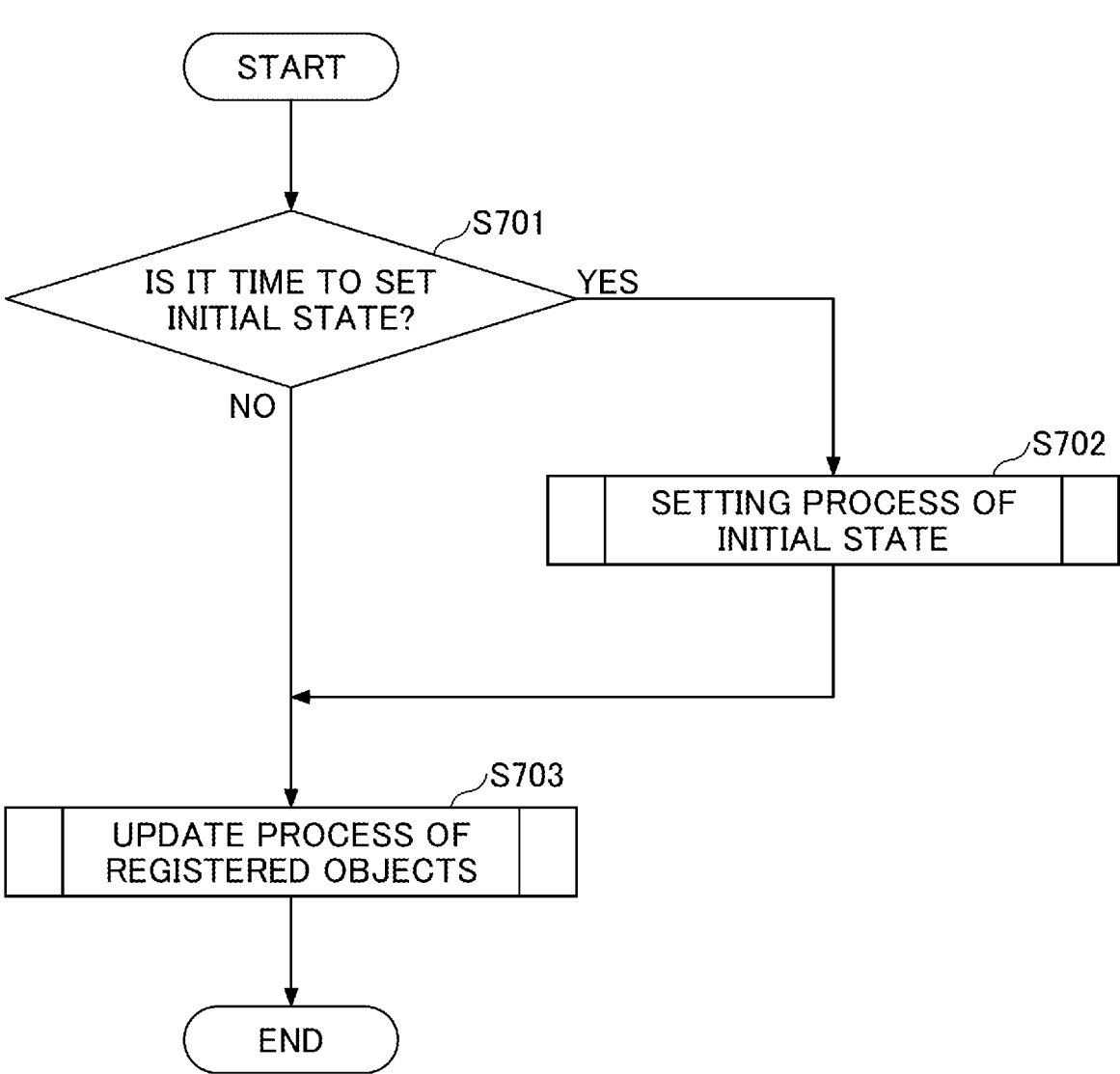
FIG. 7 is a flow chart illustrating an example of a position detection process according to one embodiment.

FIG. 7 is a flow chart illustrating an example of a position detection process according to one embodiment. This process shows an overall flow of the position detection process repeatedly executed by the wireless sensing system 1.

At Step S701, the information management unit 405 determines whether or not it is a time to set an initial state for executing an initial state setting process. The initial state setting process is a process of setting an initial state (reference state) in which a visitor, a temporary device, or the like is not present in the management target area 100.

For example, in the case where the management target area 100 is an unmanned store, a state of a radio wave in an unmanned state before opening the store is set as the initial state. Although it is assumed that the initial state does not change frequently, the initial state may change due to, for example, introduction of a new device to the store, store, movement of a product shelf, or the like. In addition, in the case where the management target area 100 is a factory, the initial state changes due to, for example, rearrangement of a line or the like. Therefore, it is desirable to set the initial state regularly (e.g., twice a day).

In the case where it is a time to set the initial state, the information management unit 405 causes the process to transition to Step S702. On the other hand, in the case where it is not a time to set the initial state, the information management unit 405 causes the process to transition to Step S703.

Once transitioning to Step S702, the information management unit 405 executes an initial state setting process. For example, the information management unit 405 executes the initial state setting process as will be described later with FIGS. 8A and 8B.

Once transitioning to Step S703, the information management unit 405 executes a process of updating registered objects, for example, as will be described later with FIGS. 9 to 11.

(Initial State Setting Process 1)

FIG. 8A is a flow chart illustrating an example of an initial state setting process according to one embodiment. This process is an example of processing executed by the information management unit 405 at Step S702 in FIG. 7.

At Step S801, the information management unit 405 identifies, for example, the most frequent CSI in each sensing direction from the CSI history list 602 as illustrated in FIG. 6B.

At Step S802, the information management unit 405 sets the most frequent CSI in each sensing direction as the initial state. For example, in the case where the management target area 100 is a store, the most frequent CSI in each sensing direction is set to the initial state (reference state) because it can be considered that a period of time during which no person is present, such as a period of time during which no customer is present, a period while the store is closed, and the like is the longest in each sensing direction.

At Step S803, the information management unit 405 updates the CSI initial state list 601, for example, as illustrated in FIG. 6A, with the most frequent CSI in each sensing direction.

By executing the process in FIG. 8A, the information management unit 405 can regularly update the CSI initial state list 601 as illustrated in FIG. 6A.

Note that the information management unit 405 may execute another initial state setting process 2 illustrated in FIG. 8B in addition to (or instead of) the process illustrated in FIG. 8A.

(Initial State Setting Process 2)

FIG. 8B is a flow chart illustrating another example of an initial state setting process according to one embodiment. This process shows another example of a process executed by the information management unit 405 at Step S702 in FIG. 7.

At Step S811, the information management unit 405 identifies the most frequent radar reflection value in each sensing direction from the radar reflection value history list 604, for example, as illustrated in FIG. 6D.

At Step S812, the information management unit 405 sets most frequent radar reflection value in each sensing direction as the initial state.

At Step S813, the information management unit 405 updates the radar reflection value initial state list 603, for example, as illustrated in FIG. 6C, with the most frequent radar reflection value in each sensing direction.

By executing the process in FIG. 8B, the information management unit 405 can regularly update the radar reflection value initial state list 603 as illustrated in FIG. 6C.

Note that for example, as illustrated in FIG. 6A, in the case where the CSI initial state list 601 is obtained, the process in FIG. 8B may be omitted (or may not be omitted). On the other hand, for example, in the case where it is desired to obtain CSI in a millimeter wave band, but the device 120 cannot handle the millimeter wave band, the wireless sensing system 1 may generate the radar reflection value initial state list 603 as illustrated in FIG. 6C, to execute wireless sensing by the radar reflection value. In addition, in the case where there are a small number of devices 120 that can handle the millimeter wave band, the wireless sensing system 1 may execute wireless sensing by using both the CSI initial state list 601 as illustrated in FIG. 6A and the radar reflection value initial state list 603 as illustrated in FIG. 6C. Further, the wireless sensing system 1 may execute wireless sensing by using both the CSI initial state list 601 as illustrated in FIG. 6A and the radar reflection value initial state list 603 as illustrated in FIG. 6C, all the time.

(Process of Updating Registered Objects)

FIG. 9A is a flow chart illustrating an example of a process of updating registered objects according to one embodiment. This process shows an overall flow of the process of updating registered objects executed by the wireless sensing system 1, for example, at Step S703 in FIG. 7.

At Step S901, the information management unit 405 executes a process of generating an object list. For example, the information management unit 405 executes the process of generating an object list, as will be described later with FIG. 9B.

At Step S902, the information management unit 405 executes a process of rewriting registered objects. For example, the information management unit 405 executes the process of rewriting registered objects as will be described later with FIGS. 10 and 11.

(Object List Generation Process)

FIG. 9B is a flow chart illustrating an example of a process of generating an object list. For example, this process shows an example of a process executed by the information management unit 405 at Step S901 in FIG. 9A.

At Step S911, the information management unit 405 clears the detected object list 502. For example, the information management unit 405 deletes data included in the detected object list 502 as illustrated in FIG. 5B.

At Step S912, the information management unit 405 issues a command to the wireless device 110 to scan the management target area 100. Here, scanning means obtaining CSI (or radar reflection value) in each predetermined direction. The predetermined direction corresponds to, for example, a direction 0001, a direction 0002, and so on of the CSI initial state list 601 (or the radar reflection value initial state list 603).

The method of scanning in each direction is executed by beamforming that has been known. Beamforming is a technique in which, in the case where a radio wave is transmitted from the wireless device 110, the interference state is changed by changing the phase of the transmission wave among the multiple antennas 111, to control the intensity (amplitude) of the radio wave at each angle.

At Step S913, the information management unit 405 extracts, as an object presence region, a direction in which the CSI (or radar reflection value) at a detection time T is different from that in the initial state, and assigns a detection ID to the direction. For example, in the case where the amplitude value and the phase value of the CSI at the detection time T are not included between a maximum value and a minimum value of the CSI initial state list, the information management unit 405 may determine that these are different from the initial state.

At Step S914, the information management unit 405 registers the detection ID assigned at Step S913 and the position of the object in the detected object list 502 as illustrated in FIG. 5B. Note that the position of the object is a position in a three-dimensional coordinate system. For example, the information management unit 405 may calculate the position of the object from the direction of scanning and the distance to the object calculated from the time until the radar reflection wave reaches the wireless device 110. Alternatively, the information management unit 405 may be a unit that estimates the distance to the object by machine learning of the CSI or the like.

At Step S915, the information management unit 405 registers the CSI (or radar reflection value) at the detection time T in the CSI history list 602 (or the radar reflection value history list 604).

By executing the process in FIG. 9B, the wireless sensing system 1 can detect an object present in the management target area 100 and register the object in the detected object list 502.

(Process of Rewriting Registered Objects)

Figure 10:
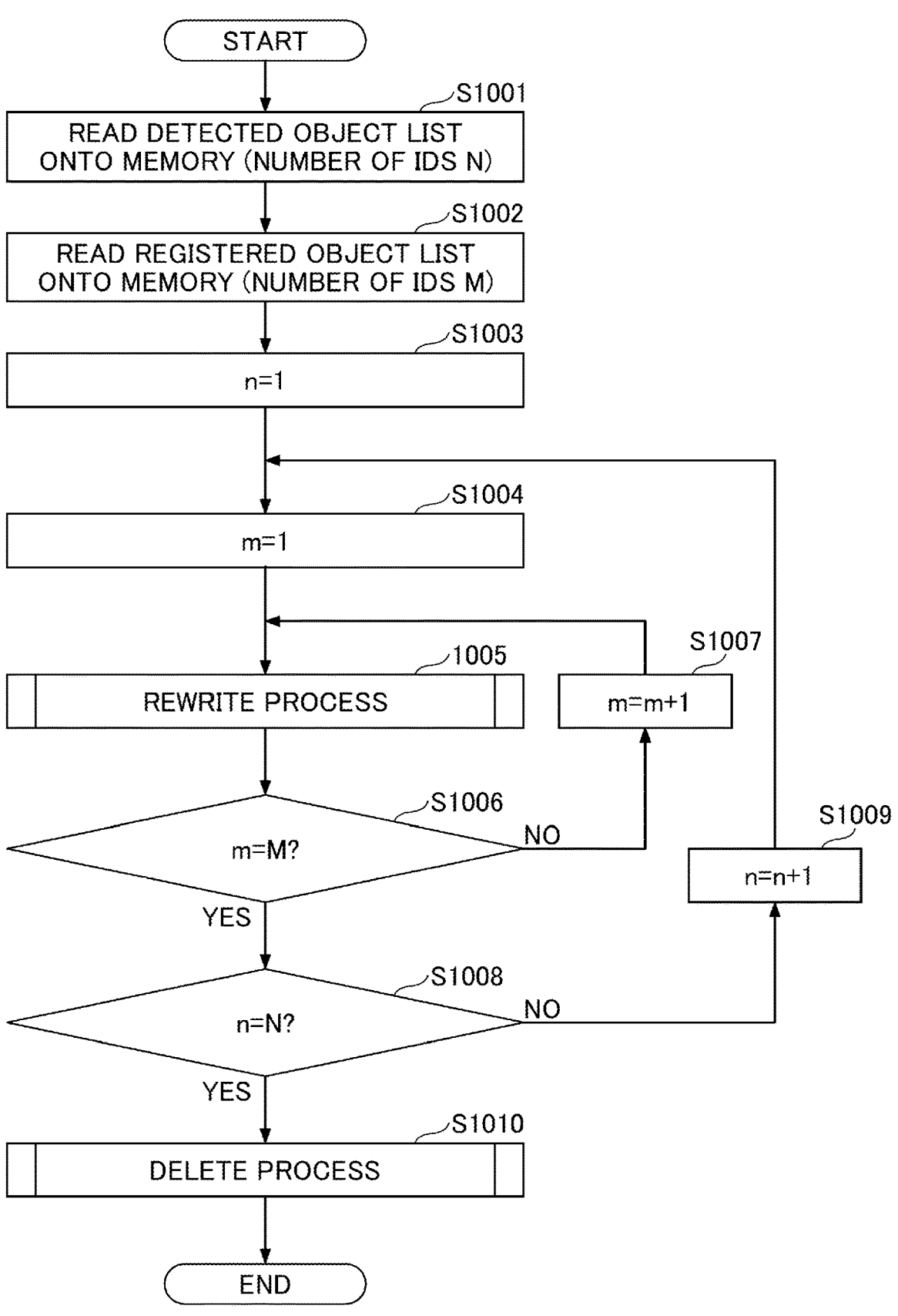
FIG. 10 is a flow chart (part 1) illustrating an example of a process of rewriting registered objects according to one embodiment.
Figure 11A:
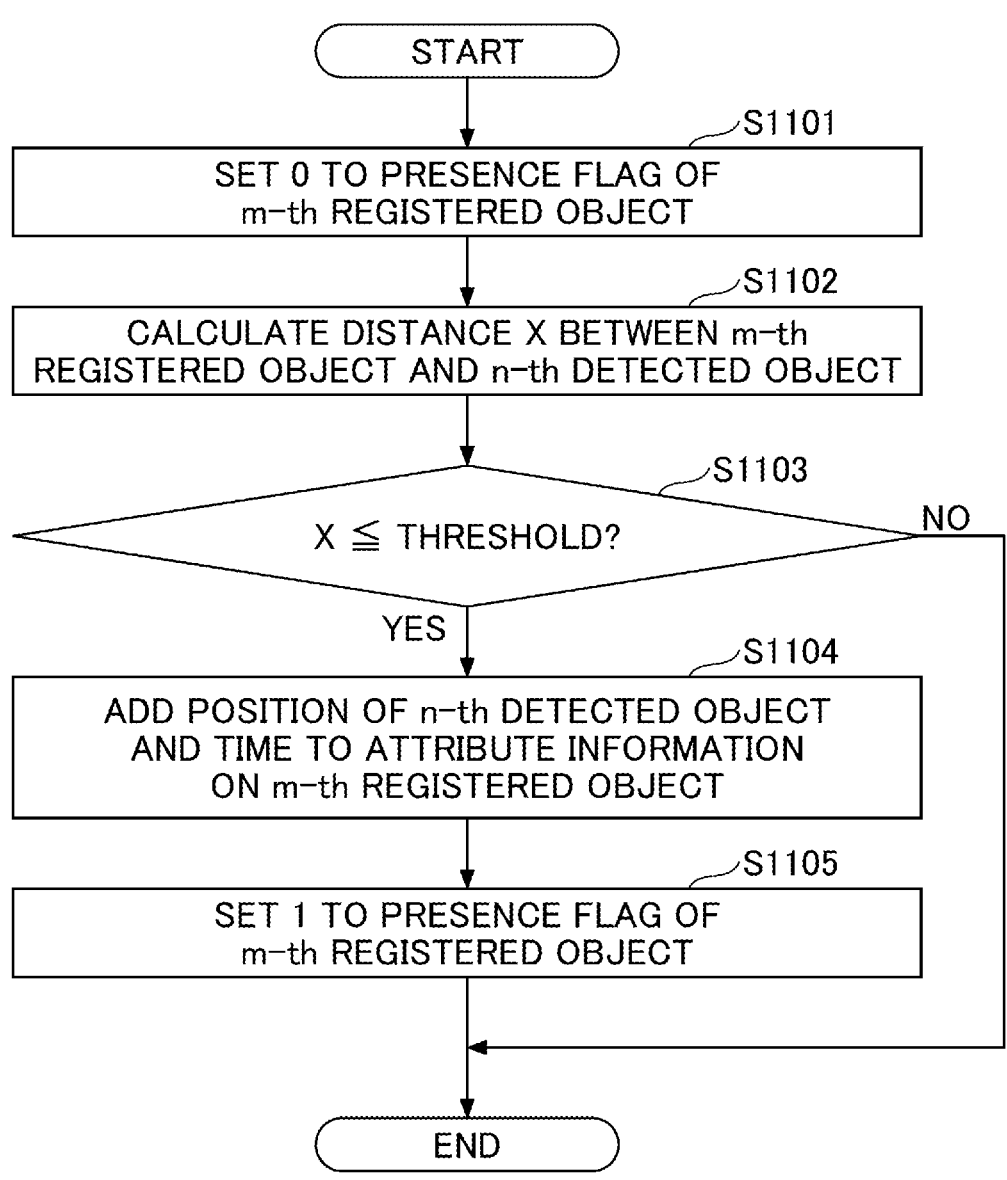
FIG. 11A is a flow chart (part 2) illustrating an example of a process of rewriting registered objects according to one embodiment.

FIGS. 10 and 11A are flow charts illustrating an example of a process of rewriting registered objects according to one embodiment. This process shows an example of a process executed by the information management unit 405, for example, at Step S902 in FIG. 9A.

At Step S1001, the information management unit 405 reads the detected object list 502 onto a memory such as a RAM 203. Here, it is assumed that the number of detection IDs registered in the detected object list 502 is N.

At Step S1002, the information management unit 405 reads the registered object list 503 onto a memory such as a RAM 203. Here, it is assumed that the number of registered IDs registered in the registered object list 503 is M.

At Step S1003, the information management unit 405 initializes a variable n to "1". In addition, at Step S1004, the information management unit 405 initializes a variable m to "1".

At Step S1005, the information management unit 405 executes a rewrite process as will be described later with FIG. 11A.

At Step S1006, the information management unit 405 determines whether or not m=M. If not m=M, the information management unit 405 adds 1 to m and returns the process to Step S1004 at Step S1007. On the other hand, if m=M, the information management unit 405 causes the process to transition to Step S1008.

Once transitioning to Step S1008, the information management unit 405 determines whether or not n=N. If not n=N, the information management unit 405 adds 1 to n and returns the process to Step S1005 at Step S1009. On the other hand, if n=N, the information management unit 405 causes the process to transition to Step S1010.

By the process described above, the rewrite process at Step S1005 can be executed for all combinations of data items included in the detected object list 502 and data items included in the registered object list 503.

Once transitioning to Step S1010, the information management unit 405 executes a delete process as will be described later with FIG. 11B.

(Rewrite Process)

FIG. 11A is a flow chart illustrating an example of a rewrite process. This process shows an example of a process executed by the information management unit 405, for example, at Step S1005 in FIG. 10.

At Step S1101, the information management unit 405 sets the presence flag of the m-th registered object to "0".

At Step S1102, the information management unit 405 calculates a distance X between the m-th registered object and the n-th detected object. For example, the information management unit 405 calculates the distance X from the position of the m-th registered object and the position of the n-th detected object.

At Step S1103, the information management unit 405 determines whether or not the distance X is less than or equal to a threshold value. Here, it is assumed that as the threshold value, a value for determining that the m-th registered object and the n-th detected object are the same object is set in advance. In the case where the distance X is less than or equal to the threshold value, the information management unit 405 causes the process to transition to Step S1104. On the other hand, in the case where the distance X is not less than or equal to the threshold value, the information management unit 405 ends the process in FIG. 11A.

Once transitioning to Step S1104, the information management unit 405 adds (overwrites) the position of the n-th detected object and time, to the attribute information on the m-th registered object.

At Step S1105, the information management unit 405 sets the presence flag of the m-th registered object to "1".

By executing the process in FIG. 11A, in the case where the distance X between the m-th registered object and the n-th detected object is less than or equal to the threshold value, the information management unit 405 determines that the objects are the same, and updates the attribute of the m-th registered object with the attribute of the n-th detected object.

(Delete Process)

Figure 11B:
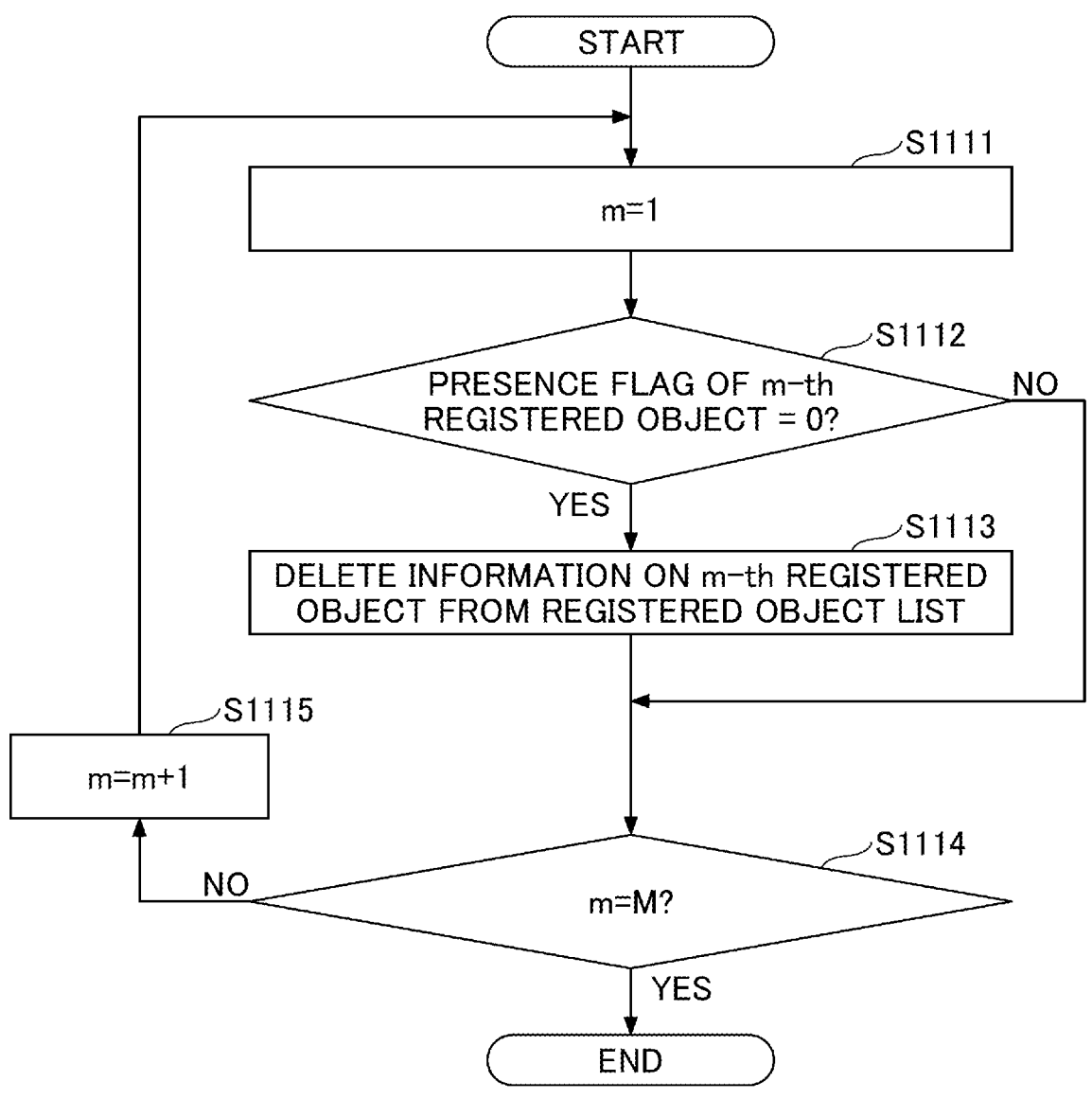
FIG. 11B is a flow charts (part 2) illustrating an example of a delete process according to one embodiment.

FIG. 11B is a flow chart illustrating an example of a delete process. This process shows an example of a process executed by the information management unit 405, for example, at Step S1010 in FIG. 10.

At Step S1111, the information management unit 405 initializes a variable m to "1".

At Step S1112, the information management unit 405 determines whether or not the presence flag of the m-th registered object is "0". In the case where the presence flag of the m-th registered object is "0", the information management unit 405 causes the process to transition to Step S113. On the other hand, in the case where the presence flag of the m-th registered object is not "0", the information management unit 405 causes the process to transition to Step S1114.

Once transitioning to Step S1113, the information management unit 405 deletes information on the m-th registered object from the registered object list 503.

Once transitioning to Step S1114, the information management unit 405 determines whether or not m=M. If not m=M, the information management unit 405 adds 1 to m at Step S1115, and returns the process to Step S1111. On the other hand, if m=M, the information management unit 405 ends the process in FIG. 11B.

By executing the process in FIG. 11B, the information management unit 405 can delete information on an object that is not present from the registered object list 503.

As above, through the position detection processes described in FIGS. 7 to 11, the wireless sensing system 1 can detect and track the position of an object in the management target area 100 by using the wireless device 110.

<Action Detection Process>

Next, an action detection process in which the wireless sensing system 1 senses an action of the person 20 who operates the device 120 in the management target area 100 by using a radio wave will be described.

(Overview)

Radio waves have been used for object detection and distance measurement, and by using a higher frequency, more accurate sensing becomes possible. For example, in the case where the frequency becomes higher than or equal to 60 GHz, the shape or a gesture of an object can also be considered as the detection target. Gesture has wide variations depending on work contents, physical characteristics, habits upon moving the body, and the like, and hence, it would be difficult to establish an algorithm that can handle these variations as patterns of states of radio waves. Therefore, many prior studies on behavior sensing have seen combinations with machine learning as promising.

However, actions of the person 20 who operates the device 120 vary depending on, for example, work contents, physical characteristics, physical conditions, or the like, and it is difficult to train a machine learning model so that actions of the person can be sensed based on patterns of states of radio waves.

Therefore, in the present embodiment, an action of the person 20 to be detected by the device 120 is associated with an operation performed on the device, and a fact that a predetermined device operation is performed is notified from the device to the information processing device 10 as correct answer data, to promote machine learning. For example, the information processing device 10 leans a machine learning model by using a state of a radio wave (e.g., CSI) immediately before a predetermined device operation is performed, as correct answer data.

<Flows of Processes>

Here, as one example, in the following description, it is assumed that the wireless sensing system 1 detects an action of the person 20 who is confused while operating the device 120.

<Machine Learning Process>

(Process of Device)

Figure 12A:
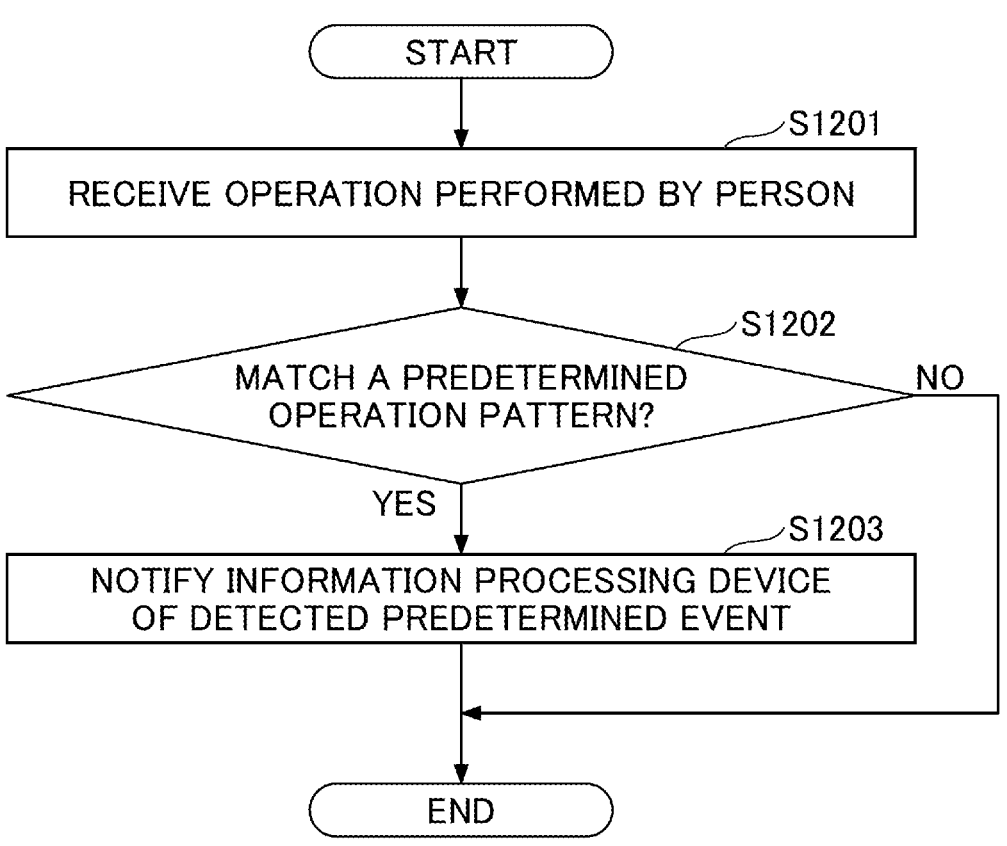
FIGS. 12A and 12B are flow charts illustrating examples of machine learning processes according to one embodiment.

FIG. 12A is a flow chart illustrating an example of a machine learning process executed by the device.

At Step S1201, once the device control unit 422 of the device 120 receives an operation performed on the device 120 by the person 20, the device 120 executes processing at Step S1202 and the subsequent steps.

At Step S1202, the detection unit 423 of the device 120 determines whether or not the received operation matches a predetermined operation pattern set in advance.

For example, in the case of detecting an action of the person 20 who is confused while operating the device 120, trial-and-error of operations performed on the device 120 by the person 20 may be detected. An occurrence of such trial and error can be detected through operations performed on the device 120. For example, in the case where the person 20 selects an operation button once, and then, performs an operation of returning to the original screen, it can be determined that the first operation is an erroneous operation. Similarly, in the case where the person 20 changes a setting condition of an operation once performed, and then, performs the operation again, it can be determined that an erroneous setting has been made for the first operation. In the present embodiment, such patterns of erroneous operations or trial-and-error are set in advance in the device 120.

In the case where the operation pattern matches a predetermined operation pattern, the detection unit 423 causes the process to transition to Step S1203. On the other hand, in the case where the operation pattern does not match a predetermined operation pattern, the detection unit 423 ends the process in FIG. 12A.

Once transitioning to Step S1203, the detection unit 423 of the device 120 notifies the information processing device 10 via the wireless communication unit 421 that a predetermined event (e.g., trial and error of operations of the device 120) have been detected.

(Process of Information Processing Device)

Figure 12B:
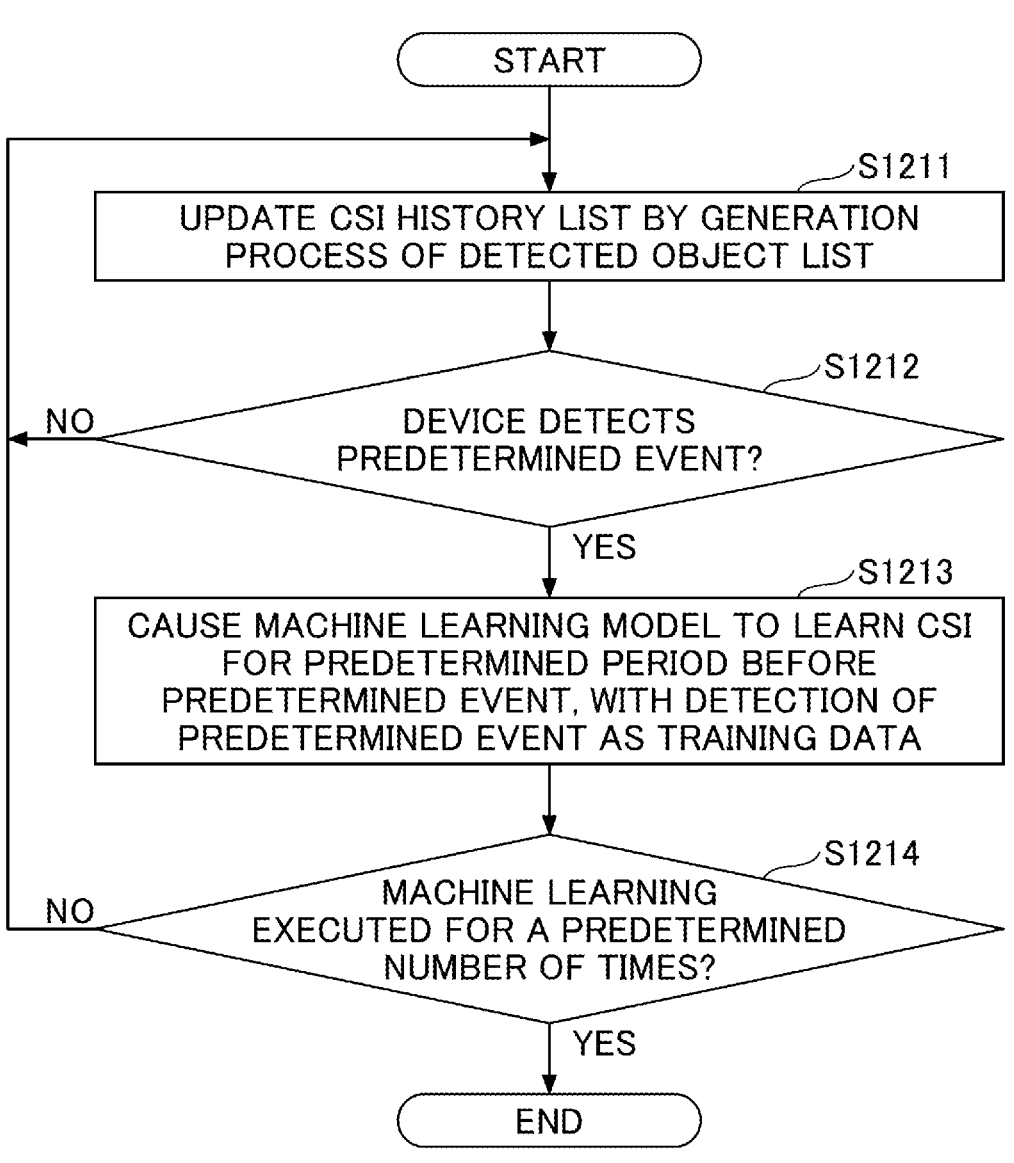

FIG. 12B is a flow chart illustrating an example of a machine learning process executed by the information processing device. This process shows an example of a process executed by the information processing device 10 corresponding to the process executed by the device 120 described with FIG. 12A.

At Step S1211, the information management unit 405 of the information processing device 10 executes the process of generating an object list described in FIG. 9B, to update the CSI history list 602.

At Step S1212, the machine learning unit 403 of the information processing device 10 determines whether or not the device 120 detects a predetermined event (e.g., trial and error of operations of the device 120). For example, the information management unit 405 determines whether or not a notification indicating detection of a predetermined event is received from the device 120. In the case where the device 120 detects a predetermined event, the machine learning unit 403 causes the process to transition to Step S1213. On the other hand, in the case where the device 120 does not detect a predetermined event, the machine learning unit 403 returns the process to Step S1211.

Once transitioning to Step S1213, the machine learning unit 403 causes the machine learning model 407 to learn CSI in a predetermined period before a predetermined event, with the predetermined event being detected by the device 120 as training data. For example, the machine learning unit 403 obtains, from the CSI history list 602, CSI of a predetermined period immediately before the time at which the device 120 has detected a predetermined event, and applies machine learning to the machine learning model 407, by using training data obtained by adding the time at which the predetermined event occurs and the like to the obtained CSI.

At Step S1214, the machine learning unit 403 determines whether or not machine learning has been executed for a predetermined number of times. In the case where machine learning has not been executed for the predetermined number of times, the machine learning unit 403 returns the process to Step S1211. On the other hand, in the case where machine learning has been executed for the predetermined number of times, the machine learning unit 403 ends the process in FIG. 12B.

By executing the process in FIG. 12B, the information processing device 10 can obtain a trained machine learning model 407.

<Process after Machine Learning>

FIG. 13A is a flow chart illustrating an example of a process executed by the information processing device after machine learning. Note that it is assumed that at the beginning of a process in FIG. 13A, the machine learning model 407 that has been trained through the processes in FIG. 12A and FIG. 12A is stored in the storage unit 406 or the like.

At Step S1301, the information management unit 405 executes the process of generating an object list described in FIG. 9B, to update the CSI history list 602.

At Step S1302, the machine learning unit 403 of the information processing device 10 inputs the updated CSI for the predetermined period to the trained machine learning model 407. Accordingly, the trained machine learning model 407 outputs a determination (classification) result indicating whether or not a predetermined event has occurred.

At Step S1303, the notification unit 404 of the information processing device 10 determines whether or not the predetermined event has occurred. For example, the notification unit 404 determines whether or not the predetermined event has occurred, based on the determination result output from the trained machine learning model 407. In the case where the predetermined event has occurred, the notification unit 404 notifies the device 120 of a notification indicating that the predetermined event has occurred in the device 120 via the communication unit 401.

The information processing device 10 can detect that a predetermined event has occurred in the device 120 by repeatedly executing the process in FIG. 13A.

(Process of Device)

FIG. 13B is a flow chart illustrating an example of a process executed by the device after machine learning. This process shows an example of a process executed by the device 120 corresponding to the process executed by the information processing device 10 described with FIG. 13A.

At Step S1311, in response to receiving the notification from the information processing device 10, the device 120 executes processing at Step S1312 and the subsequent steps.

At Step S1312, the device control unit 422 of the device 120 determines whether or not a predetermined event has occurred. For example, in the case where the notification received from the information processing device 10 is a notification indicating that the predetermined event has occurred, the device control unit 422 determines that the predetermined event has occurred. In the case where the predetermined event has occurred, the device control unit 422 causes the process to transition to Step S1313. On the other hand, in the case where the predetermined event has not occurred, the device control unit 422 ends the process in FIG. 13B.

Once transitioning to Step S1313, the device control unit 422 executes processing corresponding to the predetermined event. For example, in the case where the predetermined event is an action of the person 20 who is confused while operating the device 120, the device control unit 422 displays on the operation panel 316 a display element to guide the user to an operation manual on the operation panel 316. In addition, in the case where the amount of communication data increases (in the case where a large amount of data is transmitted and received) in a communication process used for a function of the device 120 (for example, a communication process for image formation such as reception of print data and transmission of scan data), a process for changing the originally used frequency band may be performed so that the communication process used for the function of the device 120 is performed using a high frequency band and wireless sensing is performed using a low frequency band. In addition, in a case where the communication data amount of the communication process used for the function of the device 120 decreases again, a changing process for returning to use of the originally used frequency band may be performed.

In this way, according to the present embodiment, based on a pattern of a state of a radio wave, it becomes easier to train a machine learning model so as to be capable of sensing an action of the person 20 who operates the device 120. Note that the process of sensing an action of the person 20 who operates the device 120 is an example of a process of sensing a state of an object.

<Process of Allocating Wireless Resources>

(Overview)

In wireless communication, multiple frequency bands are used. In the present embodiment, as one example, it is assumed that the wireless device 110 can handle three frequency bands of the 2.4 GHz band, the 5 GHz band, and the 60 GHz band. There has been a demand for executing data communication and wireless sensing for sensing presence, position, behavior, and the like of an object using such multiple frequency bands.

However, the principal purpose of wireless LAN communication or the like is data communication, and it is not desirable to hinder data communication due to wireless sensing.

Here, a resource allocation method to appropriately allocate wireless resources to wireless sensing according to a communication environment in the wireless sensing system 1 that senses presence, position, behavior, or the like of an object by a radio wave used for wireless communication, will be described.

First Embodiment

FIG. 14 is a flow chart illustrating an example of a process of allocating wireless resources according to a first embodiment. This process shows an example of a process of allocating a frequency band of higher than or equal to 28 GHz band among multiple frequency bands available for sensing with prioritizing sensing, in the case of sensing a gesture or the like of the person 20, where the sensing would be difficult unless using a millimeter wave or a terahertz wave higher than or equal to 28 GHz.

Note that this process may be executed by the resource allocation unit 409 of the information processing device 10 or may be executed by the resource allocation unit 414 of the wireless device 110. Here, in order to make the description easier, in the following description, it is assumed that the resource allocation unit 409 of the information processing device 10 executes a process in FIG. 14.

At Step S1401, the resource allocation unit 409 obtains information on a frequency band to be used for sensing. For example, the resource allocation unit 409 may inquire of the devices 120 in the management target area 100 about the frequency to be used for sensing by each of the devices 120. Note that the resource allocation unit 409 starts this process, for example, at a predetermined time before a time that is scheduled to execute sensing.

At Step S1402, the resource allocation unit 409 determines whether or not there is a request for data communication (or data communication) whose wireless resources (frequency band and communication timing) overlap with those of sensing. In the case where there is a request for data communication whose wireless resources overlap with those of sensing, the resource allocation unit 409 causes the process to transition to Step S1403. On the other hand, in the case where there is no request for data communication whose wireless resources overlap with those of sensing, the resource allocation unit 409 causes the process to transition to Step S1407.

Once transitioning to Step S1403, it is determined whether or not sensing whose wireless resources overlap with those of data communication specifies only a 60 GHz band. Here, if the sensing specifies only the 60 GHz band, it can be determined that the sensing is sensing the state of an object (e.g., a gesture of a person 20).

In the case where the overlapping sensing specifies only the 60 GHz band, the resource allocation unit 409 causes the process to transition to Step S1404. On the other hand, in the case where the overlapping sensing does not specify only the 60 GHz band, the resource allocation unit 409 causes the process to transition to Step S1405.

Once transitioning to Step S1404, the resource allocation unit 409 allocates wireless resources of the 60 GHz band with prioritizing sensing. For example, the resource allocation unit 409 allocates more wireless resources to wireless sensing than to data communication in the 60 GHz band.

For example, the resource allocation unit 409 sets the wireless resource of the 60 GHz band with prioritizing sensing, by one of the following methods.

In the first method, the resource allocation unit 409 ignores the request for data communication. Specifically, acceptance information such as a CTS (Clear To Send) signal is not returned to the device 120 that has requested data communication. In this case, the device 120 determines that the communication is busy and waits for data communication; therefore, the wireless resources of the 60 GHz band are not consumed.

In the second method, the resource allocation unit 409 switches the frequency to be used for communication with the device 120 that has made the request for data communication to a frequency band other than the 60 GHz band. For example, the resource allocation unit 409 transmits an acceptance signal such as a CTS signal after switching the frequency band, and the device 120 transmits data to the wireless device 110 in the switched band other than the 60 GHz band.

The third method is a method in which the resource allocation unit 409 accepts data communication in the 60 GHz band, but sets a ratio of resources to be allocated to the data communication to be lower. For example, the resource allocation unit 409 may allocate, among multiple sub bands included in the 60 GHz band, approximately 5% to 20%, favorably approximately 10%, to data communication.

Alternatively, the resource allocation unit 409 may allocate, within the communication time in the 60 GHz band, for example, approximately 5% to 20%, favorably approximately 10%, to data communication. In the case of using a time-division method of dividing the communication time, periods of time allocated for data communication occur during scanning by beamforming; therefore, the wireless device 110 temporarily stops scanning by beamforming in such a period of time, to make a setting to restart scanning after the end of data communication.

In this case, when the amount of data communication is large, it would not be possible to avoid reducing resources to be allocated to sensing, and sensing may not complete within a predetermined time interval (e.g., three seconds) during which sensing is repeatedly executed. However, when the amount of data communication is large, the sensing time is allowed to take three seconds or longer because it is often the case that people on the spot do not move actively as they are executing web search, making phone calls, and the like. Note that in the case where the sensing is not completed within the predetermined time, the wireless device 110 postpones the start time of the next sensing.

At Step S1405, the resource allocation unit 409 changes the frequency band used for sensing in which the wireless resources overlap with those of the data communication, to a frequency band in which there is no request for data communication. For example, in the case where there is a request for data communication in the 5 GHz band, the resource allocation unit 409 sets the frequency band to be used for sensing to the 2.4 GHz band or the 60 GHz band that are other than the 5 GHz band.

Once transitioning to Step S1407, once a scheduled time comes, the information processing device 10 executes sensing using the wireless device 110. For example, the wireless sensing system 1 executes the process of generating an object list as illustrated in FIG. 9B.

The wireless sensing system 1 repeatedly executes the process in FIG. 14 at predetermined time intervals (e.g., at intervals of one to five seconds, favorably at intervals of two to three seconds). Accordingly, the wireless sensing system 1 allocates wireless resources to sensing in response to a request for data communication, for example, every time sensing is to be executed.

As above, according to the first embodiment, it becomes possible to appropriately allocate wireless resources to wireless sensing according to a communication environment in the wireless sensing system 1 that senses an object by a radio wave used for wireless communication.

Second Embodiment

For example, if sensing requested by the device 120 is to sense for identifying whether or not the person 20 is present close to the device 120 (an alternative of a human sensor), the sensing can be executed by CSI analysis using the 2.4 GHz band, the 5 GHz band, or the 60 GHz band. In this case, sensing by radar reflection value using the 60 GHz band can also be executed.

On the other hand, in the case where it is desired to sense a human a gesture or the like, it is difficult to execute sensing unless CSI analysis using the 60 GHz band; therefore, it is desirable that the 60 GHz band is dedicated to sensing or prioritized to sensing in a period of time during which sensing is executed.

Figure 15:
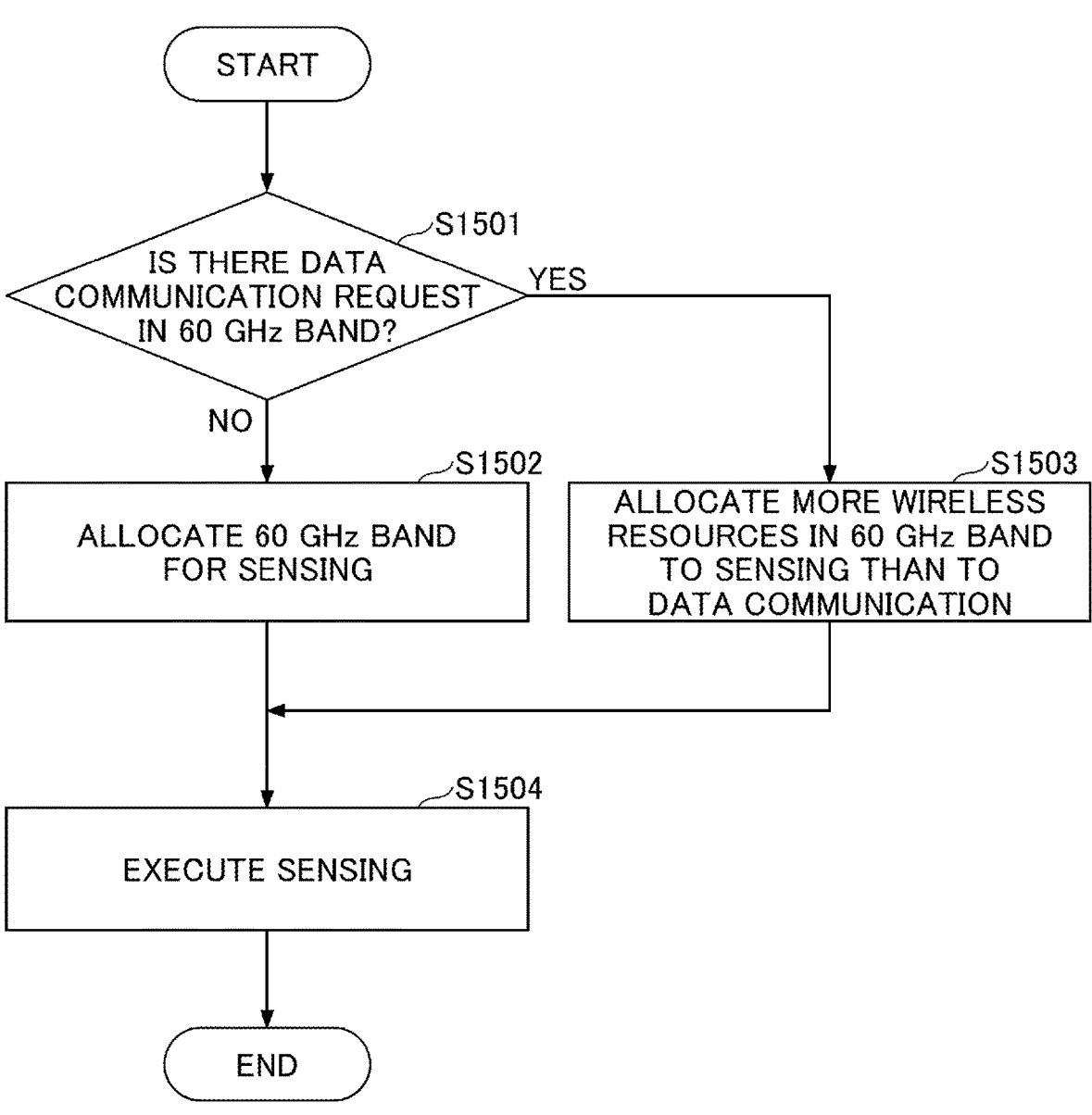
FIG. 15 is a flow chart illustrating an example of a process of allocating wireless resources according to a second embodiment.

FIG. 15 is a flow chart illustrating an example of a process of allocating wireless resources according to a second embodiment. This process shows an example of a process of allocating the 60 GHz band with prioritizing sensing, in the case of sensing a state of an object such as a gesture or the like of the person 20, where the sensing would be difficult unless using a millimeter wave or a terahertz wave higher than or equal to 28 GHz.

Note that this process may be executed by the resource allocation unit 409 of the information processing device 10 or may be executed by the resource allocation unit 414 of the wireless device 110. Here, in order to make the description easier, in the following description, it is assumed that the resource allocation unit 409 of the information processing device 10 executes a process in FIG. 14.

At Step S1501, the resource allocation unit 409 determines whether or not there is a request for data communication (or data communication) in the 60 GHz band. In the case where there is no request for data communication in the 60 GHz band, the resource allocation unit 409 causes the process to transition to Step S1502. On the other hand, in the case where there is a request for data communication in the 60 GHz band, the resource allocation unit 409 causes the process to transition to Step S1503.

Figures 16A, 16B:
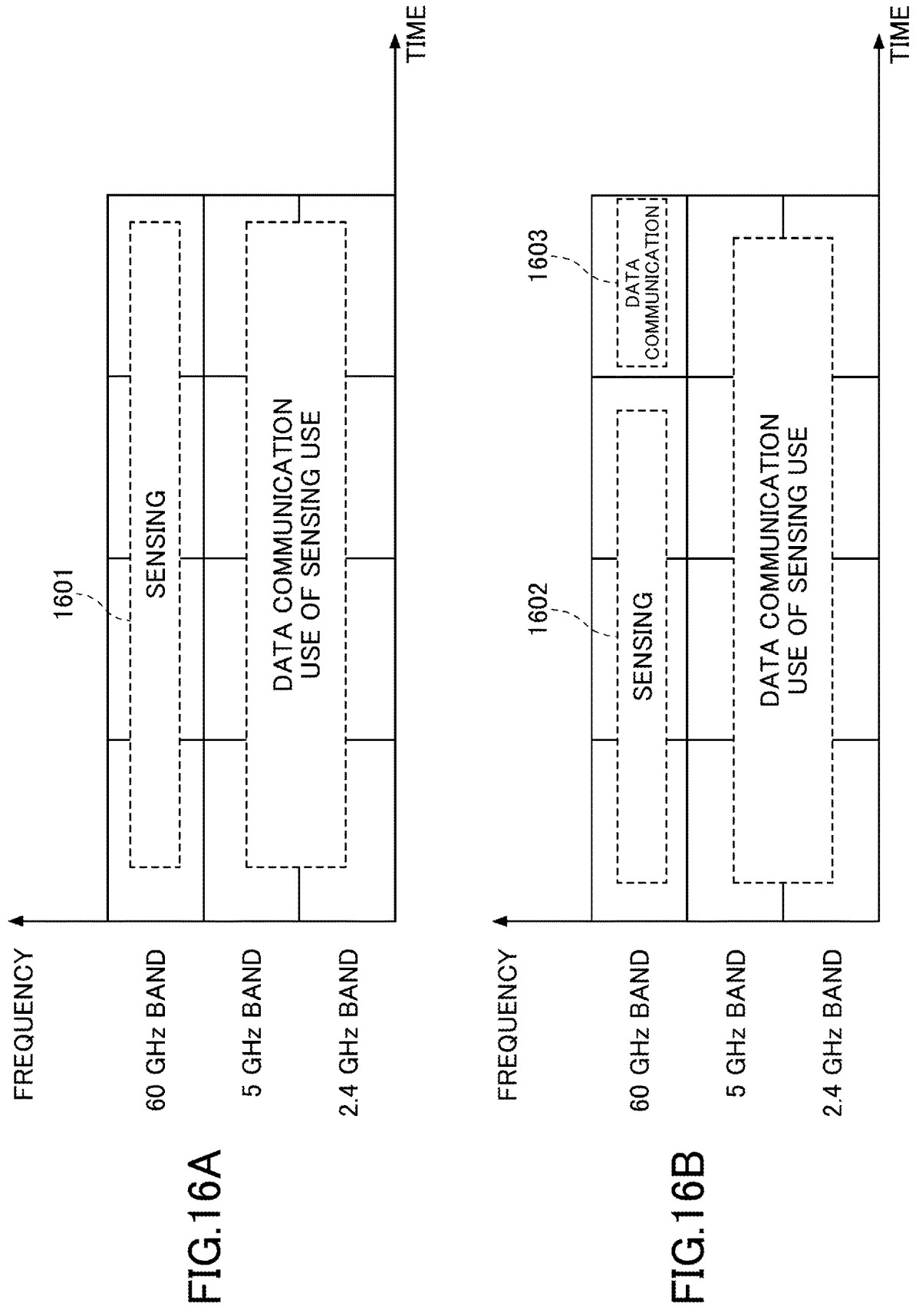
FIGS. 16A and 16B are diagrams illustrating schematic views of wireless resource allocation according to the second embodiment.

Once transitioning to Step S1502, for example, as illustrated in FIG. 16A, the resource allocation unit 409 allocates the 60 GHz band for sensing. In the example in FIG. 16A, among three frequency bands of the 60 GHz band, the 5 GHz band, and the 2.4 GHz band, the 60 GHz band as a frequency band of 28 GHz or higher in which more accurate sensing is possible, is allocated to wireless resources 1601 for sensing.

Once transitioning to Step S1503, the resource allocation unit 409 allocates more wireless resources to wireless sensing than to data communication in the 60 GHz band. For example, the resource allocation unit 409 may increase the ratio of subcarriers to be allocated to sensing among multiple subcarriers included in the 60 GHz band. Alternatively, for example, as illustrated in FIG. 16B, the resource allocation unit 409 may increase the time to be allocated to sensing in the use time of the 60 GHz band. In the example in FIG. 16G, wireless resources are allocated so as to make a use time 1602 for sensing become longer than a use time 1603 for data communication in the 60 GHz band.

At Step S1504, once a scheduled time comes, the information processing device 10 executes sensing using the wireless device 110.

The wireless sensing system 1 repeatedly executes the process in FIG. 15 at predetermined time intervals (e.g., at intervals of one to five seconds, favorably at intervals of two to three seconds). Accordingly, the wireless sensing system 1 allocates wireless resources to sensing in response to a request for data communication, for example, every time sensing is to be executed.

Note that in the IEEE802.11 standard, although the device 120 that can handle the 24 GHz band and the 5 GHz band used conventionally has become popular, the device 120 that can handle the 60 GHz band that is relatively new is not so popular at present. Therefore, even if the wireless device 110 can handle the three bands of the 2.4 GHz band, the 5 GHz band, and the 60 GHz band, there is a likelihood that the device 120 in the management target area 100 can handle only the 2.4 GHz band and the 5 GHz band.

In such a case, by executing the process in FIG. 15, to effectively utilize the 60 GHz band by allocating the 60 GHz band for sensing.

As above, according to the respective embodiments in the present disclosure, it becomes possible to appropriately allocate wireless resources to wireless sensing according to a communication environment in the wireless sensing system 1 that senses an object by a radio wave used for wireless communication.

Examples of Use Scenes

For example, the information processing system 1 may be configured to manage electronic devices installed in a hotel. Various electronic devices are installed in a hotel. For example, a check-in machine may be installed in the lobby. By managing these electronic devices by the information processing system 1, depending on the communication environment in the hotel, it becomes possible to appropriately allocate wireless resources to wireless sensing.

In addition, for example, the information processing system 1 may be configured to manage electronic devices installed in an airport. In an airport, it is necessary to go through procedures such as ticketing, check-in, baggage inspection, and the like before boarding an aircraft, and boarding tickets are processed by dedicated electronic devices in the respective procedures. By managing these electronic devices by the information processing system 1, depending on the communication environment in the airport, it becomes possible to appropriately allocate wireless resources to wireless sensing.

In addition, for example, the information processing system 1 may be configured to manage electronic devices such as retrieval terminals installed in a book store. By managing these electronic devices by the information processing system 1, depending on the communication environment of the book store, it becomes possible to appropriately allocate wireless resources to wireless sensing. In addition to the above-described hotels, airports, and bookstores, the information processing system 1 can also be used in public facilities and public spaces including stations. For example, detection of a behavior of a user in trouble and a notification process to a terminal of an attendant for displaying a guide screen or providing assistance in accordance the behavior, detection of a behavior of a suspicious person or the like and a monitoring start process, alarm for securing safety, a notification process to a terminal of a guard, and the like can be executed via the information processing system 1.

In addition, for example, the information processing system 1 may be configured to manage electronic devices such as personal computers installed in a factory. By managing these electronic devices by the information processing system 1, depending on the communication environment in the factory, it becomes possible to appropriately allocate wireless resources to wireless sensing.

In addition, for example, the information processing system 1 may be configured to manage electronic devices installed in an unmanned store of a convenience store. In such a convenience store, electronic devices such as a multi-function peripheral (MFP) and a checkout device are installed. By managing these electronic devices by the information processing system 1, depending on the communication environment in the convenience store, it becomes possible to appropriately allocate wireless resources to wireless sensing. In addition to the above-described factories and convenience stores, the information processing system 1 can be similarly used for an operation of a device in a situation where the device is installed in an unmanned place or a place with few people. For example, detection of a behavior of a user in trouble and a notification process to a terminal of a person in charge for guidance display or operation method explanation according to the behavior can be executed via the information processing system 1.

In addition, for example, the information processing system 1 may be configured to manage multiple electronic appliances installed in a home. By managing these electronic devices by the information processing system 1, depending on the communication environment in the home, it becomes possible to appropriately allocate wireless resources to wireless sensing. In addition, detection of a behavior of a person to be watched over, such as a child or an elderly person in a house or indoors, a start/stop process of watching recording according to the behavior, a message transmission process to a terminal of a family, a start/stop process of transmitting recording data, and the like can be executed via the information processing system 1. In this case, the system may include a television, a refrigerator, or the like as one of home electric appliances (electronic devices) and an imaging unit (camera).

<Supplements>

The functions in the embodiments described above can be implemented by one or more processing circuits. Here, a "processing circuit" as used in the present specification includes a processor programmed so as to execute functions by software, such as a processor implemented by electronic circuitry, and a device such as an application specific integrated circuit (ASICs), a digital signal processor (DSP), a field programmable gate array (FPGA), a conventional circuit module, or the like designed to execute the functions described above.

In addition, a group of devices described in the embodiments is merely one group among multiple computing environments for implementing the embodiments disclosed in the present description. In a certain embodiment, the information processing device 10 may include multiple computing devices that are implemented as a server cluster. The multiple computing devices may be configured to communicate with each other via any type of communication link that includes a network, a shared memory, and the like, to execute processes disclosed in the present specification. Similarly, the wireless device 110 may include multiple computing devices configured to communicate with each other.

Further, the information processing device and the wireless device 110 may be configured so as to share the disclosed processing steps in various combinations. For example, a process executed by a predetermined unit may be executed by the information processing device 10 or the wireless device 110. In addition, the components of the information processing device 10 may be integrated into one device or may be divided into multiple devices.

Note that the present invention is not limited to the embodiments described above; various changes can be made without departing from the technical substance, and all the technical matters included in the technical concept described in the claims are covered by the present invention. Although the embodiments described above show favorable examples, it is possible for one skilled in the art to implement various modified examples from the disclosed contents. Such modified examples are also included in the technical scope described in the claims.

What is claimed is:

1. A wireless sensing system that senses presence, position, or behavior of an object by a radio wave used for wireless communication, and communicates with a device, the wireless sensing system comprising:

a wireless sensing device including a wireless communication device, a memory, and a processor configured to, before executing sensing, based on a request for data communication from the device, allocate wireless resources to be used for data communication and the sensing, wherein when there is a request for data communication in which the wireless resources for the data communication overlap with the wireless resources for the sensing, and a frequency band used for the sensing includes a frequency band of 28 GHz or higher among a plurality of frequency bands available for the sensing, the processor preferentially allocates the wireless resources in the frequency band of 28 GHz or higher to the sensing, and when the frequency band used for the sensing includes a frequency band of less than 28 GHz among the plurality of frequency bands available for the sensing, the processor changes the frequency band used for the sensing to a frequency band in which there is no request for data communication.

2. The wireless sensing system as claimed in claim 1, wherein in a case where there is no request for data communication in a frequency band of 28 GHz or higher among the plurality of frequency bands available for the sensing, the processor allocates the frequency band of 28 GHz or higher to the sensing.

3. The wireless sensing system as claimed in claim 2, wherein the processor allocates, in a case where there is a request for data communication in the frequency band of 28 GHz or higher, more wireless resources to the sensing than to the data communication.

4. The wireless sensing system as claimed in claim 1, wherein the processor obtains information on a frequency band to be used for the sensing, and in a case where there is no request for data communication whose wireless resources overlap with those of the sensing, allocates a frequency band used for the sensing to the sensing.

5. The wireless sensing system as claimed in claim 4, wherein in a case where there is a request for data communication whose wireless resources overlap with those of the sensing, and a frequency band used for the sensing is the frequency band of 28 GHz or higher among the plurality of frequency bands available for the sensing, the processor allocates wireless resources of the frequency band of 28 GHz or higher with prioritizing the sensing.

6. The wireless sensing system as claimed in claim 5, wherein in a case of receiving a request for data communication in the frequency band of 28 GHz or higher, the processor allocates a frequency band different from the frequency band of 28 GHz or higher to the data communication.

7. The wireless sensing system as claimed in claim 5, wherein in a case where there is a request for data communication whose wireless resources overlap with those of the sensing, and the frequency band used for the sensing is not the frequency band of 28 GHz or higher, the processor allocates a frequency band different from the frequency band used for the sensing to the sensing.

8. The wireless sensing system as claimed in claim 1, wherein the sensing is executed at predetermined time intervals, and in a case where the sensing is not completed within any of the predetermined time intervals, start time of the sensing to be executed next is postponed.

9. The wireless sensing system as claimed in claim 1, wherein the processor determines that a predetermined event has occurred in the device based on the sensing, and when the determination that the predetermined event has occurred, the processor transmits a notification indicating that the predetermined event has occurred to the device.

10. The wireless sensing system as claimed in claim 9, wherein a first device that transmits the notification and a second device that receives the request for data communication are the same device.

11. A resource allocation method executed by a wireless sensing device that senses presence, position, or behavior of an object by a radio wave used for wireless communication, and communicates with a device, the resource allocation method comprising:

allocating, before executing sensing, based on a request for data communication from the device, wireless resources to be used for data communication and the sensing;

when there is a request for data communication in which the wireless resources for the data communication overlap with the wireless resources for the sensing, and a frequency band used for the sensing includes a frequency band of 28 GHz or higher among a plurality of frequency bands available for the sensing, preferentially allocating, the wireless resources in the frequency band of 28 GHz or higher to the sensing; and when the frequency band used for the sensing includes a frequency band of less than 28 GHz among the plurality of frequency bands available for the sensing, changing the frequency band used for the sensing to a frequency band in which there is no request for data communication.

12. The resource allocation method as claimed in claim 11, the resource allocation method further comprising:

determining that a predetermined event has occurred in the device based on the sensing, and when the determining that the predetermined event has occurred, transmitting a notification indicating that the predetermined event has occurred to the device.

13. The resource allocation method as claimed in claim 12, wherein a first device that transmits the notification and a second device that receives the request for data communication are the same device.

14. A non-transitory computer-readable recording medium having electromagnetically-readable instructions stored thereon, which when executed, cause a wireless sensing device that senses presence, position, or behavior of an object by a radio wave used for wireless communication, and communicates with a device, to execute a process comprising:

allocating, before executing sensing, based on a request for data communication from the device, wireless resources to be used for data communication and the sensing;

when there is a request for data communication in which the wireless resources for the data communication overlap with the wireless resources for the sensing, and a frequency band used for the sensing includes a frequency band of 28 GHz or higher among a plurality of frequency bands available for the sensing, preferentially allocating, the wireless resources in the frequency band of 28 GHz or higher to the sensing; and when the frequency band used for the sensing includes a frequency band of less than 28 GHz among the plurality of frequency bands available for the sensing, changing the frequency band used for the sensing to a frequency band in which there is no request for data communication.

15. The non-transitory computer-readable recording medium as claimed in claim 14, the process further comprising:

determining that a predetermined event has occurred in the device based on the sensing, and when the determining that the predetermined event has occurred, transmitting a notification indicating that the predetermined event has occurred to the device.

16. The non-transitory computer-readable recording medium as claimed in claim 15, wherein a first device that transmits the notification and a second device that receives the request for data communication are the same device.

\* \* \* \* \*